(12) United States Patent
Vaidyanathan et al.

(10) Patent No.: US 12,555,071 B2
(45) Date of Patent: Feb. 17, 2026

(54) INTELLIGENT GROUPING OF ORDER OBJECTS

(71) Applicant: SAP SE, Walldorf (DE)

(72) Inventors: Mahesh Vaidyanathan, Bengaluru (IN); Ananya Malviya, Bengaluru (IN); Rashmi Amogh K, Bengaluru (IN)

(73) Assignee: SAP SE, Walldorf (DE)

( * ) Notice: Subject to any disclaimer, the term of this patent is extended or adjusted under 35 U.S.C. 154(b) by 318 days.

(21) Appl. No.: 18/143,956

(22) Filed: May 5, 2023

(65) Prior Publication Data

US 2024/0370820 A1 Nov. 7, 2024

(51) Int. Cl.
*G06Q 10/087* (2023.01)
*G06F 16/28* (2019.01)

(52) U.S. Cl.
CPC ......... *G06Q 10/087* (2013.01); *G06F 16/285* (2019.01)

(58) Field of Classification Search
CPC ... G06Q 10/087; G06F 16/285; G06F 16/906; G06F 18/23
USPC ................. 707/644, 737, 738, 740
See application file for complete search history.

(56) References Cited

U.S. PATENT DOCUMENTS

| | | | | |
|---|---|---|---|---|
| 8,332,773 B2* | 12/2012 | Husoy | ..................... | G06F 9/451 700/83 |
| 12,056,161 B2* | 8/2024 | Ghoshal | ................ | G06F 16/285 |
| 2010/0250621 A1* | 9/2010 | Kashima | ................ | G06Q 10/10 707/E17.044 |
| 2021/0256548 A1* | 8/2021 | Heinonen | .......... | G06Q 30/0269 |
| 2023/0088183 A1* | 3/2023 | Villanueva | ............... | G06N 5/01 707/723 |

OTHER PUBLICATIONS

Sandeep Bagchi, "A Hard Look at Financial Close Challenges and How to Overcome Them," SAP Press Blog, https://blog.sap-press.com/a-hard-look-at-financial-close-challenges-and-how-to-overcome-them, printed Dec. 1, 2020, 11 pages.
Sandeep Bagchi, "How SAP S/4HANA Helps Entity Close: Fast and Accurate Reporting," SAP Press Blog, https://blog.sap-press.com/how-sap-s4hana-helps-entity-close-fast-and-accurate-reporting#:~:text=The, Feb. 17, 2021, 11 pages.
Scott Beaver, "What is Financial Close and Why is it Important?", NetSuite, https://www.netsuite.com/portal/resource/articles/accounting/financial-close.shtml, Jun. 8, 2021, 11 pages.
SAP S/4HANA Cloud for Advanced Financial Closing | SHIP, "User Guide," printed Nov. 18, 2022, 6 pages.

(Continued)

*Primary Examiner* — Phong H Nguyen
(74) *Attorney, Agent, or Firm* — Klarquist Sparkman, LLP

(57) ABSTRACT

A computer-implemented method can receive an incoming order object, determine compatibility between the incoming order object and an existing order group, responsive to finding that the incoming order object is compatible with the existing order group, adding the incoming order object to the existing order group. The method can also determine compatibility between the incoming order object and an existing order object, and responsive to finding that the incoming order object is compatible with the existing order object, form a new object group comprising the incoming order object and the existing order object.

20 Claims, 17 Drawing Sheets

(56) References Cited

OTHER PUBLICATIONS

Tipalti, "Understanding Financial Close: What is It & What is The Process," https://tipalti.com/en-eu/understanding-financial-close/, printed Nov. 15, 2022, 10 pages.

Michael Whitmire, "What is the Month-End Close Process," https://floqast.com, Accounting Archives | FloQast, Mar. 23, 2022, 11 pages.

* cited by examiner

| Indicator (obj 1) | Indicator (obj 2) | Group Indicator |
|---|---|---|
| L | L | L |
| H | H | H |
| H | N | H |
| L | N | L |
| N | N | N |

INTELLIGENT GROUPING OF ORDER OBJECTS

BACKGROUND

Enterprise Order Management (EOM) systems are software solutions designed to manage the entire order fulfillment process for businesses. These systems typically handle entire transaction processes from order capture to delivery and post-delivery support. Some vendors or suppliers prefer to have a single invoice statement for multiple orders so that only one payment can be made for the multiple orders all at once. This multi-order invoice statement is also known as a summary invoice or summary statement. Historically, grouping of orders has been a manual process and is usually left to the discretion of vendors or suppliers. Not only is the manual process tedious and inefficient, but also it is error prone. Thus, there remains a need for improved EOM systems supporting automatic order grouping.

DETAILED DESCRIPTION

Example 1—Overview of Order Grouping

Figure 1:
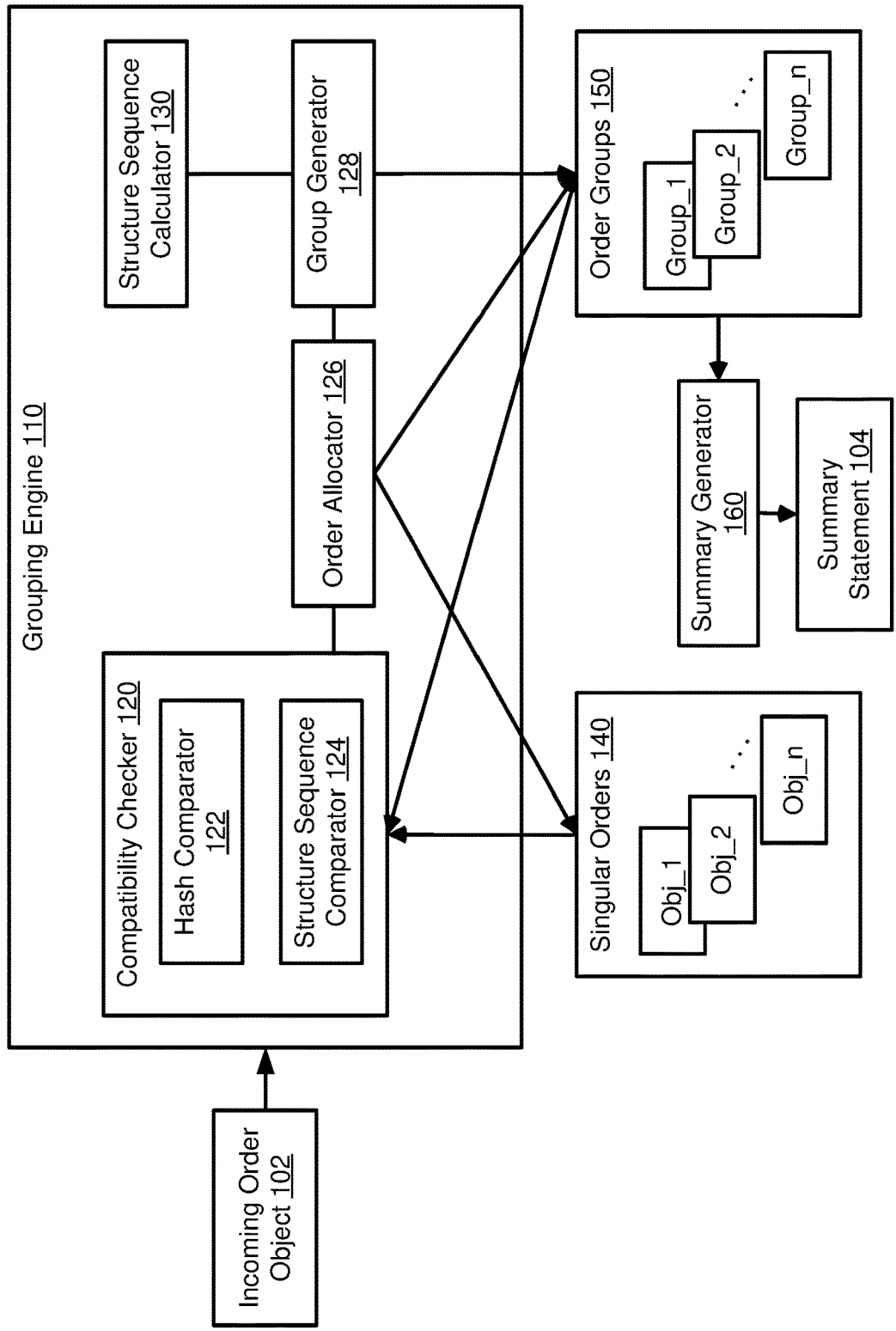
FIG. 1 is an overall block diagram of an example computing system configured to implement intelligent order grouping.

Order grouping is the process of consolidating multiple purchase orders into a single invoice statement for a specific vendor or supplier. The purpose of order grouping is to simplify the procurement process, reduce costs, and improve efficiency. Despite the potential benefits of order grouping, its implementation in EOM systems is technically challenging. For example, order grouping technology requires integration with existing enterprise systems such as enterprise resource planning, inventory management, and purchasing software. A manual order grouping process requires vendors or suppliers to determine the common attributes of the orders to be grouped, which could lead to a lot of errors at the time of invoice creation. Implementing order grouping technology may also require customization to ensure it aligns with the specific needs of the business. Further, the order grouping technology needs to be scalable to handle large volumes (e.g., thousands or even millions) of orders in real time (e.g., <1 second delay), which can be challenging, especially during peak procurement periods when order volumes are high.

Thus, it would be advantageous for an intelligent order grouping system which can not only accurately and efficiently group orders in real-time, but also is sufficiently flexible to handle different order formats. Such intelligent order grouping technologies can be applied across a wide variety of enterprise software environments.

Example 2—Example Fields and Sections in Order Objects

In a computing environment, purchase orders can be represented as order objects, which are software artifacts that can be stored in computer-readable storage media and processed by corresponding software applications. Thus, purchase orders and order objects are used interchangeably hereinafter.

Typically, an order object includes a plurality of fields located at different sections (also referred to as "levels") of the order object. For example, order objects can have two different sections: a header section (denoted as "H" hereinafter) and a line-item section (denoted as "L" hereinafter). The header section can contain fields that are common to all items included in the order object, such as "invoice number," "date of invoice," "currency," "purchaser identifier" (or "from organization," or the like), "supplier identifier" (or "to organization," or the like), "bill to address," etc. The line-item section can include fields related to individual items or products details, such as "unit of measure," "quantity," "tax," "shipment," "allowances," "charges," "special handling," etc.

Some of the fields (e.g., "currency," "from organization," "to organization," "bill to address," etc.), by convention or by predefined rules, are always located in the header section of the order objects. These fields can be referred to as "static header fields" hereinafter.

On the other hand, some of the fields (e.g., "tax," "shipment," "allowances," "charges," "special handling," etc.) can be located in either the header section or in the line-item section, or may not appear in the order objects at all. Whether these fields are included in or excluded from a particular order object, and if included, which sections these fields are located in, can define the structure of that particular order object (and the structure of an invoice created from that particular order object). Thus, these fields can also be referred to as "structure fields" or "structure elements" hereinafter. In certain circumstances, some structure elements can be added to the order objects (e.g., in addition to existing structure elements) by a supplier or vendor when creating invoices for the received purchase orders.

In order to group multiple order objects into one order group, a number of pre-determined grouping criteria can used and/or be specified by a user. A software solution can be developed to implement the order grouping based on the specified grouping criteria. Order objects that satisfy the specified grouping criteria are deemed to be compatible with each other and thus can be assigned to an order group. The grouping criteria can be based on selected fields and locations of those selected fields in the order objects.

In certain circumstances, some grouping criteria can require that order objects can be grouped together only if the order objects have one or more identical static header fields. For instance, one grouping criterion can require that order objects may not be grouped together if they were originated from different purchasers, or sent to different suppliers, or use different currencies. Another grouping criterion can provide that order objects are not permitted to be grouped together if the order objects have different bill to addresses.

As described further below, some grouping criteria can require that order objects can be grouped together only if the order objects have compatible structure elements. For example, if a structure element is located in different sections (e.g., H vs. L) of two order objects, then these two order objects are deemed to be incompatible with each other and thus cannot be grouped together. The compatibility assessment of structure elements is described more fully below.

Real-time grouping of order objects, especially when dealing with a large volume of order objects, requires efficient evaluation of various grouping criteria. In some circumstances, regrouping of order objects are needed, for example, when the grouping criteria are customized for different users and/or updated for various purposes (e.g., adding or removing one grouping criterion involving a static header field; adding or removing one structure element used in a grouping criterion, etc.). Such real-time grouping of order objects and regrouping of order objects are too complex to be performed manually. By combining hash comparison and structure sequence comparison, the intelligent order grouping technologies described herein can advantageously solve the aforementioned problems.

Although the examples described hereinafter are for grouping of order objects, it should be understood that the same principles (e.g., grouping similar documents based on custom criteria) can be applied to group other document types such as shipment notices, service entry sheets, etc.

Example 3—Example Overview of Intelligent Order Grouping System

FIG. 1 shows an overall block diagram of an example computing system 100 supporting intelligent order grouping.

As shown, the system 100 can include a grouping engine 110 and maintain two datasets: one singular order dataset 140 comprising singular order objects, and another order group dataset 150 comprising order groups. In some examples, all order objects received by the system 100 can be physically stored in one data repository. Each of the received order objects can be labelled to belong to either the singular order dataset 140 or the order group dataset 150, as described further below. Each order group in the order group dataset 150 includes two or more compatible order objects. Each singular order objects in the singular order dataset 140 is deemed to be incompatible with (and thus does not belong to) any of the order groups included in the order group dataset 150. The grouping engine 110 can include a compatibility checker 120, an order allocator 126, a group generator 128, and a structure sequence calculator 130. The compatibility checker 120 can further includes a hash comparator 122 and a structure sequence comparator 124.

For each incoming order object 102, the compatibility checker 120 can assess whether the incoming order object 102 is compatible with any of the order groups included in the order group dataset 150. As described further below, such compatibility assessment can include comparing hash values between the incoming order object 102 and the order groups (e.g., performed by the hash comparator 122). If the hash value comparison is successful, the compatibility assessment can further include comparing a structure sequence of the incoming order 102 with group structure sequences of the order groups (e.g., performed by the structure sequence comparator 124). As described herein, the group structure sequence of an order group represents structure sequences of all order objects included in that order group. If the incoming order 102 is deemed to be compatible with one or more order groups, the incoming order object 102 can be added (e.g., by the order allocator 126) to the one or more order groups. If needed, the group structure sequences of the one or more order groups to which the incoming order object 102 is added can be updated (e.g., by the structure sequence calculator 130).

Additionally, the compatibility checker 120 can assess whether the incoming order object 102 is compatible with any of the existing order objects that are not members of an existing order group to which the incoming order object 102 can be added. As described further below, such compatibility assessment can include comparing hash values between the incoming order object 102 and the existing order objects (e.g., performed by the hash comparator 122). If the hash value comparison is successful, the compatibility assessment can further include comparing structure sequences between the incoming order object 102 and the existing order objects (e.g., performed by the structure sequence comparator 124). If the incoming order objects 102 is deemed to be compatible with one or more existing order objects, a new order group including the incoming order object 102 and the one or more existing order objects can be formed (e.g., by the group generator 128). A group structure sequence of the newly formed order group can be determined (e.g., by the structure sequence calculator 130). The newly formed order group can be added in the order group dataset 150. If any of the existing order objects included in the newly formed order group is previously labeled as a singular order object, that existing order object can be removed from the singular order dataset 140.

On the other hand, if the incoming order object 102 cannot be added to any of the existing order groups included in the order group dataset 150 and the incoming order object 102 cannot form a new order group with any of the existing order objects, then the incoming order object 102 can be labeled as a singular order object and included (e.g., by the order allocator 126) in the singular order dataset 140.

In certain examples, the system 100 can further include a summary generator 160 in connection with the order group dataset 150. The summary generator 160 can be configured to generate summary invoice or summary statements 104 based on one or more order objects included in any of the order groups included in the order group dataset 150. Because the order objects in an order group are compatible with each other (e.g., have the same hash values, and have compatible structure sequences), the summary statements 104 can consolidate order objects of an order group using a common structure supporting relevant fields of the order objects.

In practice, the systems shown herein, such as system 100, can vary in complexity, with additional functionality, more complex components, and the like. For example, there can be additional functionality within the grouping engine 110, e.g., the grouping engine 110 can be configured to cache matching sequences so that for subsequently received order objects, the structure sequence comparator can use the cached data to perform compatibility assessment, thus improving operating efficiency and reducing the memory footprint. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the order objects, order groups, hash values, structure sequences, and the like, can be stored in one or more computer-readable storage media or computer-readable storage devices. The technologies described herein can be generic to the specifics of operating systems or hardware and can be applied in any variety of environments to take advantage of the described features.

Example 4—Example Overall Method for Intelligent Order Grouping

Figure 2:
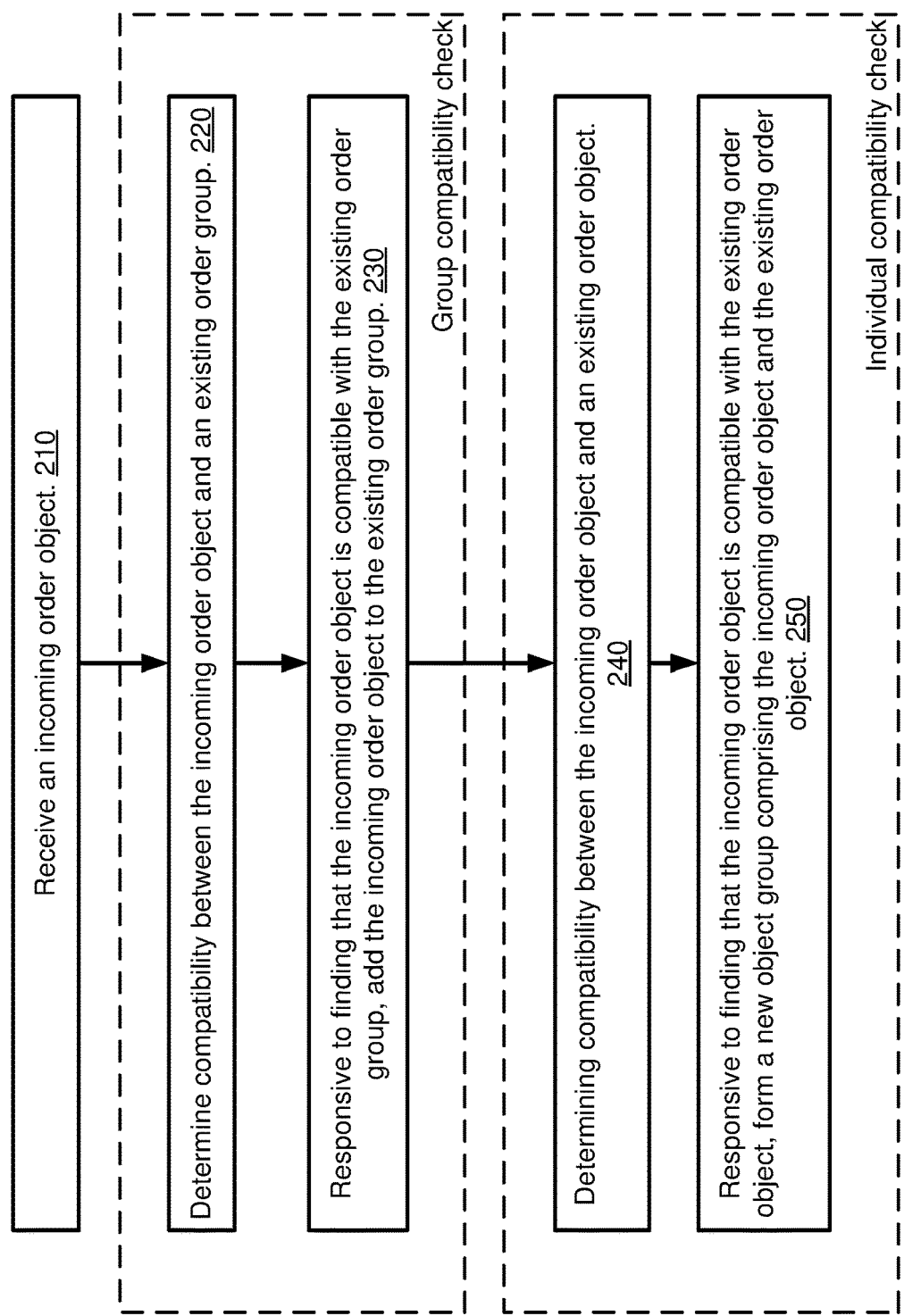
FIG. 2 is a flowchart illustrating an example overall method of implementing intelligent order grouping.

FIG. 2 is a flowchart of an example overall method 200 of implementing intelligent order grouping, and can be performed, for example, by the system of FIG. 1.

At 210, the method 200 can receive an incoming order object (e.g., 102).

At 220, the method 200 can determine, at runtime, compatibility between the incoming order object and an existing order group. The existing order group can be included in an order group dataset (e.g., 150). In any of the examples described herein, an operation performed in runtime means that the operation can be completed within 1 second, or more desirably, less than 100 millisecond. The compatibility assessment at 220 can be performed, e.g., by the compatibility checker 120.

At 230, responsive to finding that the incoming order object is compatible with the existing order group, the incoming order object can be added to the existing order group, e.g., by the order allocator 126. In some circumstances, the group structure sequence of the existing order group can be updated (e.g., by the structure sequence calculator 130).

The steps 220 and 230, collectively, can be part of a group compatibility check stage, which is described further below in reference to FIG. 3.

At 240, the method 200 can determine, at runtime, compatibility between the incoming order object and an existing order object. The existing order object can be a singular order object which is included in a singular order dataset (e.g., 140) and does not belong to any of the existing order groups. The existing order object can also be a member of an existing order group so long as the incoming order object is incompatible with (and thus cannot be added to) the existing order group. Similarly, the compatibility assessment at 240 can be performed, e.g., by the compatibility checker 120.

At 250, responsive to finding that the incoming order object is compatible with the existing order object, a new object group including the incoming order object and the existing order object can be formed, e.g., by the group generator 128. A group structure sequence for the new object group can be generated, e.g., by the structure sequence calculator 130.

The steps 240 and 250, collectively, can be part of an individual compatibility check stage, which is described further below in reference to FIG. 4.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 5—Example Method for Group Compatibility Check

Figure 3:
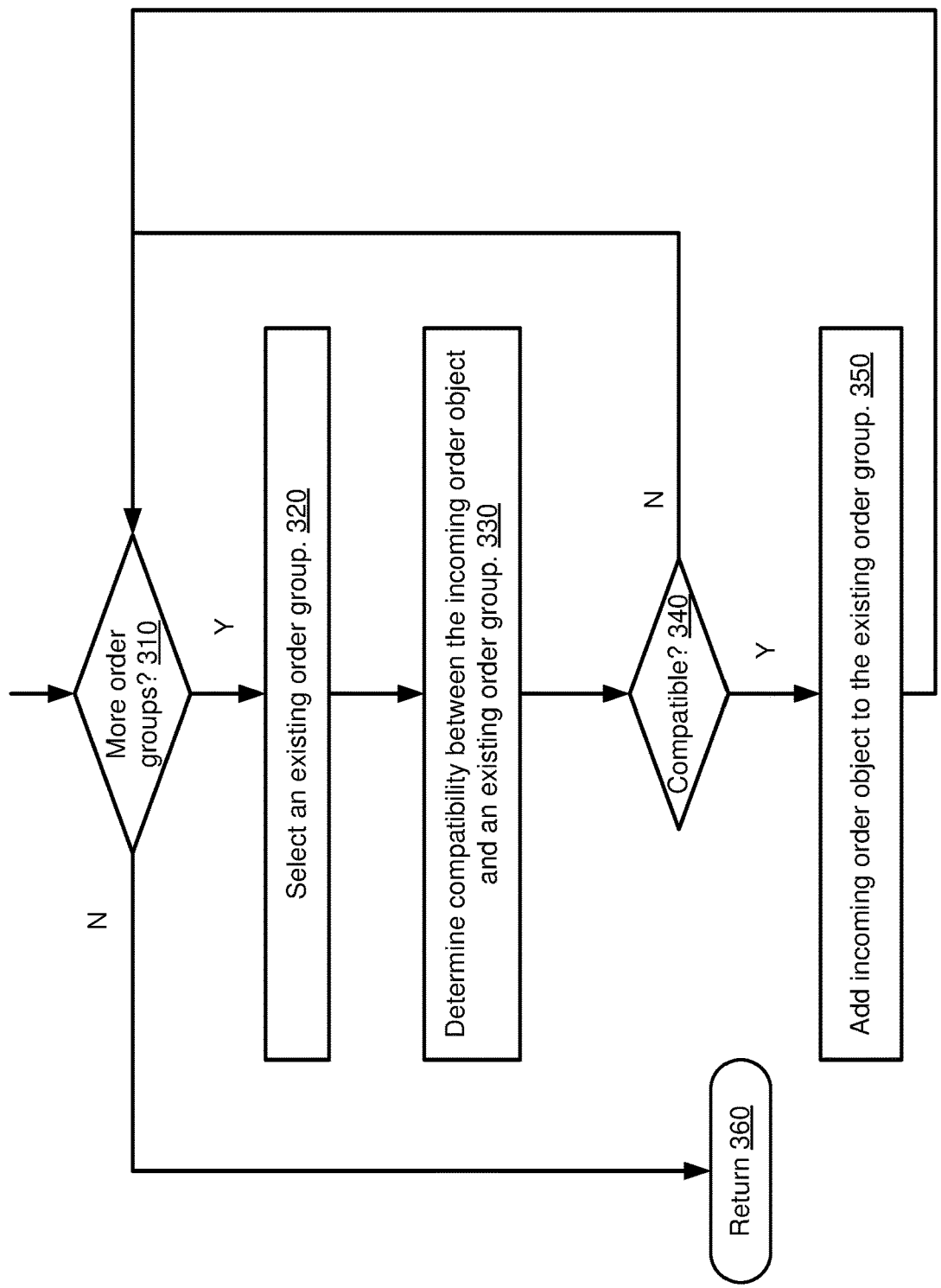
FIG. 3 is a flowchart illustrating an example method of assessing compatibility between an incoming order object and existing order groups.

FIG. 3 depicts an example method 300 for performing group compatibility check and order group allocation. As described above, the group compatibility check stage can be part of the overall method 200. For example, the method 300 can start after receiving the incoming order object at 210. Specifically, the group compatibility check can be configured to evaluate the compatibility between an incoming order object and each existing order group included in an order group dataset (e.g., 150).

At 310, a condition check is performed to determine if there are any existing order groups in the order group dataset that need to be processed.

If the condition check at 310 returns yes, an existing order group (that has not been processed) can be selected at 320.

At 330, compatibility between the incoming order object and the existing order group can be evaluated in runtime. As described further below, compatibility between the incoming order object and the existing order group can be determined by first comparing hash values between the incoming order object and the existing order group. If the hash value comparison is successful, compatibility between the incoming order object and the existing order group can be further determined based on pairwise comparison between a structure sequence of the incoming order object and a group structure sequence of the existing order group. The group structure sequence represents structure sequences of order objects included in the existing order group, At 340, a condition check is performed based on the result of compatibility assessment at 330.

If the incoming order object is found to be compatible with the existing order group, the method 300 can proceed to 350, where the incoming order object can be added to the existing order group. In some examples, a group structure sequence of the existing order group can be updated after adding the incoming order object, as described further below.

If the condition check 340 returns no, the method 300 can return to the condition check at 310.

After all existing order groups in the order group dataset have been processed, the method 300 can return at 360, which concludes the group compatibility check stage for the incoming order object.

Example 6—Example Method for Individual Compatibility Check

Figure 4:
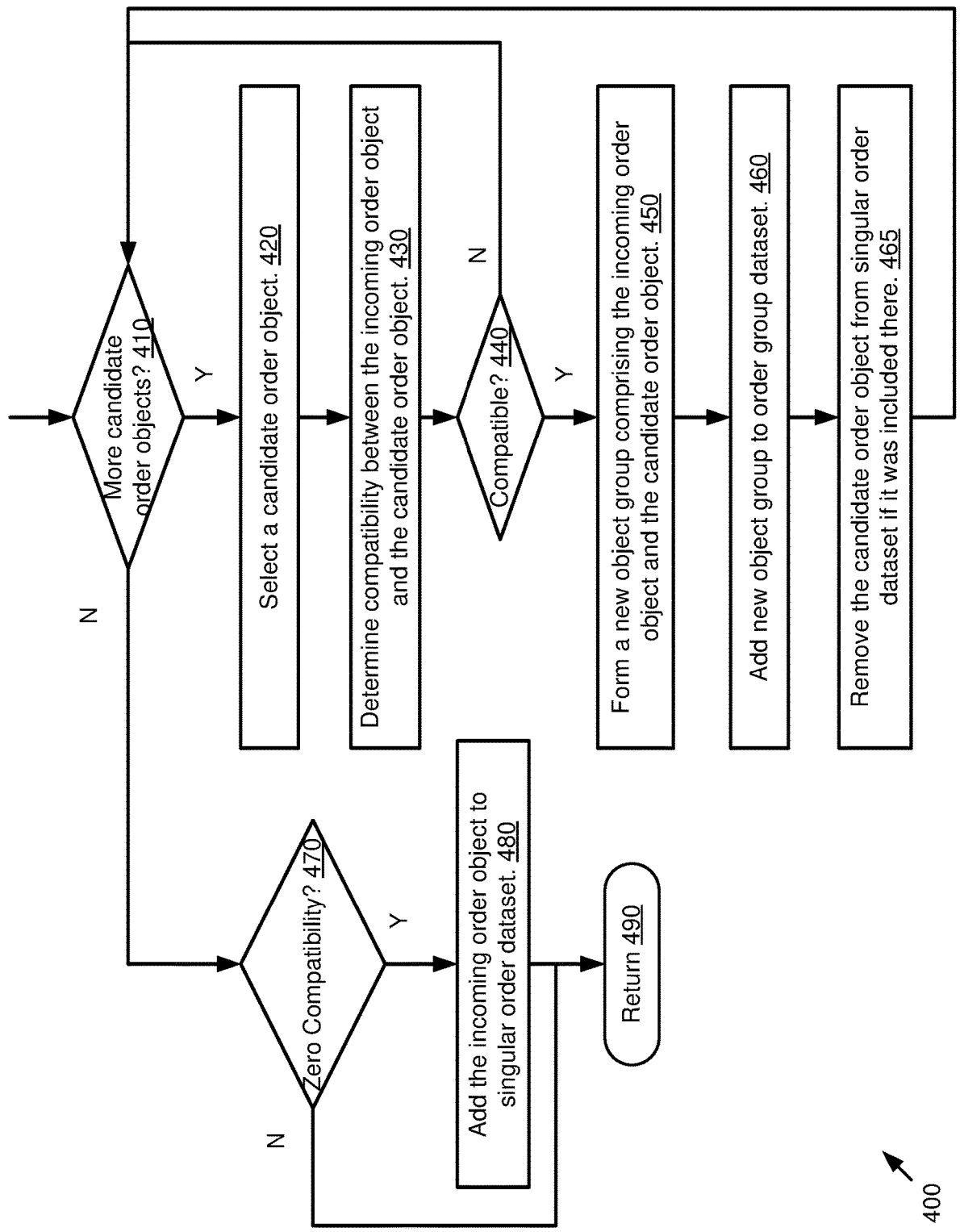
FIG. 4 is a flowchart illustrating an example method of assessing compatibility between an incoming order object and singular order objects.

FIG. 4 depicts an example method 400 for performing individual compatibility check. As described above, the individual compatibility check stage can be part of the overall method 200. For example, the method 400 can start after the conclusion of the group compatibility check stage at 360. Specifically, the individual compatibility check can be configured to evaluate the compatibility between an incoming order object and each existing order object that is not a member of an existing order group to which the incoming order object can be added.

At 410, a condition check is performed to determine if there are any existing order objects that need to be processed (also referred to as "candidate order objects"). The candidate order objects include all singular order objects included in a singular order dataset (e.g., 140). The candidate order objects also include existing order objects in any existing order groups that are not compatible with the incoming order object (e.g., the condition check at 340 of FIG. 3 returns no). In other words, each existing order object is a candidate order object and must be processed unless the existing order object is in an existing order group to which the incoming order object can be added in the group compatibility check stage (e.g., according to the step 350 of FIG. 3).

If the condition check at 410 returns yes, a candidate order object (that has not been processed) can be selected at 420.

At 430, compatibility between the incoming order object and the candidate order object can be evaluated in runtime. As described further below, compatibility between the incoming order object and the candidate order object can be determined by first comparing hash values between the incoming order object and the candidate order object. If the hash value comparison is successful, compatibility between the incoming order object and the candidate order object can be further determined based on pairwise comparison between a structure sequence of the incoming order object and a structure sequence of the candidate order object.

At 440, a condition check is performed based on the result of compatibility assessment at 430.

If the incoming order object is found to be compatible with the candidate order object, the method 400 can proceed to 450, where a new object group comprising the incoming order object and the candidate order object can be created. A group structure sequence for the new object group can also be generated, as described further below. In some examples, the incoming order object may be found to be compatible with multiple candidate order objects, thereby forming multiple new object groups. If two or more of these new object groups are compatible with each other, these compatible new object groups (deemed as intermediary order groups) can be merged together to form a consolidated order group, as described further below.

At 460, the newly created object group can be added to the order group dataset.

At 465, if the candidate order object is a singular order object (i.e., not belong to any of the existing order groups) included in the singular order dataset, it can be removed from the singular order dataset (because now it is a member of the newly formed order group). Then, the method 400 can return to the condition check at 410.

After all existing order objects have been processed, the method 400 can perform a zero-compatibility check at 470.

Specifically, at 470, the method 400 can check if the incoming order object has been determined to be not only incompatible with any of the existing order groups (e.g., the condition check 340 returns no for all existing order groups), but also incompatible with any of the candidate order objects (e.g., the condition check 440 returns no for all candidate order objects).

If the condition check at 470 returns yes, the method 400 can proceed to 480 to label the incoming order object as a singular order object and include it in the singular order dataset, and then return at 490. Otherwise, the method 400 can return at 490 directly, which concludes the individual compatibility check stage for the incoming order object.

Example 7—Example Hash Value Comparison

In certain circumstances, the compatibility checks described above (e.g., the group compatibility check at 340 and the individual compatibility check at 440) can include hash value comparisons, which can be performed, e.g., by the hash comparator 122.

In some examples, each order object described herein can include one or more hash values. Each hash value can be generated, e.g., by applying a hash function to one or more static header fields of the order objects. For example, one hash value can be generated based on three static header fields including "from organization," "to organization," and "currency." Another hash value can be generated based on a single static header field "bill to address." Yet another hash value can be generated based on a single static header field "payment term," etc. Different hash functions (e.g., depending on the underlying data types) can be applied to generate respective hash values for different static header fields.

According to one example grouping criterion, all order objects in an order group must have a common set of hash values. Thus, an order group is considered to have the same hash values as those order objects included in the order group.

When evaluating the compatibility between the incoming order object and an existing order group at 330, the one or more hash values of the incoming order object and the corresponding hash values of the existing order group can be compared in runtime. Responsive to finding a mismatch between a hash value of the incoming order object and the corresponding hash value of the existing order group, the incoming order object is deemed to be incompatible with the existing order group (e.g., the condition check 340 returns no). In other words, unless all hash values of the incoming order object match those of the existing order group, the incoming order object cannot be added to the existing order group.

Likewise, when evaluating the compatibility between the incoming order object and a candidate order object at 440, the one or more hash values of the incoming order object and the corresponding hash values of the candidate order object can be compared in runtime. Responsive to finding a mismatch between a hash value of the incoming order object and the corresponding hash value of the candidate order object, the incoming order object is deemed to be incompatible with the candidate order object (e.g., the condition check 440 returns no). In other words, unless all hash values of the incoming order object match those of the candidate order object, the incoming order object and the candidate order object cannot form a new object group.

The hash value grouping criterion can ensure all order objects included in an order group have the same data for the underlying static header fields. For example, for a hash value generated based on data of three static header fields including "from organization," "to organization," and "currency," the hash value comparison can ensure all order objects included in an order group have identical "from organization," "to organization," and "currency" header fields. Similarly, another hash value generated based on data of a single static header field "bill to address" can ensure all order objects included in an order group also have an identical "bill to address" header field. Transforming the relevant static header fields into corresponding hash values can allow faster compatibility assessment. For example, instead of string comparison of "from organization," "to organization," and "currency" sequentially between different order objects, a faster comparison of these three static header fields can be achieved by comparing their corresponding hash values.

Example 8—Example Structure Sequences

In any of the examples herein, the compatibility checks described above (e.g., the group compatibility check at 330 and the individual compatibility check at 430) can also include structure sequence comparisons, which can be performed, e.g., by the structure sequence comparator 124.

As described above, order objects can have structure elements, which refer to fields that can be located in different sections of various order objects, or do not appear in some order objects at all. In any of the examples herein, each order object can include a structure sequence. The structure sequence of an order object includes a sequence of indicators indicating presence/absence, and location (if present) of corresponding structure elements of the order object.

In certain examples, each indicator in a structure sequence can be a three-state variable indicating a status of a corresponding structure element. In one particular example, an indicator H can indicate that the corresponding structure element exists in the header section of the order object; an indicator L can indicate that the corresponding structure element exists in the line-item section of the order object; and an indicator N can indicate that the corresponding structure element does not exist in (or is excluded from) the order object.

Each indicator in the structure sequence can represent a specific structure element. The order of the indicators (thus the order of corresponding structure elements) in the structure sequence can be predefined. For example, a structure sequence including five indicators can represent the states of the following five structure elements in a predefined order: "tax," "shipment," "allowances," "charges," and "special handling." Thus, if an order object has a structure sequence H-L-L-N-N, it indicates that the "tax" field is in the header section of the order object, the "shipment" and "allowances" fields are in the line-item section of the order object, and the "charges" and "special handling" are absent from the order object. The length of the structure sequence can be user-defined, depending on the which structure elements are of interests for object grouping purposes. For example, the length of the structure sequence can be two, three, four, five, or more.

Although H, L, and N are used in the examples herein for illustrative purposes, it is to be understood that other indicators can be used to represent whether a structure element is included in an order object, and if so, which section the structure element is located in. In some examples, the number of sections can be more than two (e.g., besides a header section and a line-item section, an order object can also have a footer section or the like).

Example 9—Example Compatibility Assessment of Structure Sequences

According to one example grouping criterion, all order objects in an order group must have compatible structure sequences. In any of the examples herein, compatibility between two structure sequences can be assessed by pairwise comparison of the two structure sequences.

In the following examples, it is assumed that each indicator has three states: H, L, and N, as described above. A pair of indicators are deemed to be a compatible pair if both indicators have the H (or L) state. This indicates that the structure element represented by the pair of indicators is located in the header section (or the line-item section) in both order objects. Additionally, a pair of indicators are deemed to be a compatible pair if any of the indicators has the N state. This indicates that the structure element represented by the pair of indicators is absent in at least one of the order objects.

On the other hand, a pair of indicators are deemed to be an incompatible pair if one indicator is H and another indicator is L. In other words, the structure element represented by the indicators is located in the header section in one order object, but is located in the line-item section in the other order object. In such scenario, these two order objects are deemed to have incompatible structure sequences and cannot be grouped together.

The two structure sequences are deemed to be compatible with each other if, and only if, all pairs of indicators in the two structure sequences are determined to be compatible pairs. For example, if one order object has a structure sequence H-L-N and another order object has a structure sequence N-L-H, then these two order object are deemed to have compatible structure sequences because they have three compatible pairs of indicators (H and N, L and L, and N and H). As another example, if one order object has a structure sequence H-L-N and another order object has a structure sequence H-H-N, then these two order objects are deemed to have incompatible order sequences because the second pair of indicators have both H and L.

For each order group including a plurality of order objects, a group structure sequence can be constructed based on the structure sequences of the plurality of order objects. The group structure sequence includes a sequence of group indicators. Each group indicator can be determined based on logic operations on corresponding indicators in the structure sequences of the plurality of order objects.

Figure 5:
FIG. 5 is a table illustrating example logic operations for determining group indicators in group structure sequences.

FIG. 5 shows a table 500 that illustrates example logic operations for determining group indicators based on corresponding indicators in the structure sequences of two order objects (e.g., obj 1 and obj 2). As shown, if the indicators of both order objects are L, the corresponding group indicator can be set to L. If the indicators of both order objects are H, the corresponding group indicator can be set to H. If the indicators of both order objects are N, the corresponding group indicator can be set to N. If the indicator of one order object is H and the indicator of the other order object is N, the corresponding group indicator can be set to H. If the indicator of one order object is L and the indicator of the other order object is N, the corresponding group indicator can be set to L.

A structure sequence of an order object is deemed to be compatible with a group structure sequence of an order group if, and only if, each indicator in the structure sequence of the order object and a corresponding group indicator in the group structure sequence of the order group form a compatible pair. For example, if an order object has a structure sequence H-L-H and an order group has a group structure sequence N-L-N, then the order object is deemed to be compatible with the order group because their three pairs of indicators (H and N, L and L, and H and N) are compatible. As another example, if the order group has a group structure sequence L-L-H, then the order object is deemed to be incompatible with the order group because the first pair of indicators have both H and L.

The logic operations depicted in FIG. 5 can be used to create a group structure sequence for a newly formed order group (e.g., according to the step 450 of FIG. 4). For example, assume obj 1 refers to an incoming order object and obj 2 refers to a candidate order object, after determining that obj 1 and obj 2 are compatible with each other, the group indicators of the newly formed order group can be determined based on corresponding indicators in structure sequences of obj 1 and obj 2. In such circumstances, a group indicator can indicate that a corresponding structure element exists in the header section (e.g., if the group indicator is H) or the line-item section (e.g., if the group indicator is L) of at least one of the incoming order object and the candidate order object, or the corresponding structure element does not exist in either the incoming order object or the candidate order object (e.g., if the group indicator is N).

The logic operations depicted in FIG. 5 can also be extended for updating group structure sequences. For example, the second column of table 500 can refer to a group indicator in the group structure sequence of an existing order group, and the first column of table 500 can refer to a corresponding indicator in the structure sequence of an incoming order object that will be added to the existing order group (e.g., according to the step 350). In such circumstances, the third column of table 500 can represent the updated group indicator in the group structure sequence after the incoming order object is added to the existing order group.

The logic operations depicted in FIG. 5 can also be extended for merging two order groups. For example, the first column of table 500 can refer to a group indicator in the group structure sequence of a newly formed order group, and the second column of table 500 can refer to a corresponding group indicator in the group structure sequence of another newly formed order group. If the two newly formed order groups are compatible with each other (e.g., H and L do not appear together in any pair of group indicators, as described above), these two order groups (deemed as intermediary order groups) can be merged to form a consolidated order group. In such circumstances, the third column of table 500 can represent the corresponding group indicator in the group structure sequence of the consolidated order group.

Generally, a group indicator in the group structure sequence of an order group can indicate that a corresponding structure element exists in the header section (e.g., if the group indicator is H) or the line-item section (e.g., if the group indicator is L) of at least one of the order objects included in the order group, or the corresponding structure element does not exist in any of the order objects included in the order group (e.g., if the group indicator is N).

Example 10—Example Uses Cases of Intelligent Order Grouping

FIGS. 6-15 show various examples that illustrate the systems and methods of intelligent order grouping described above. Each of figures depicts a use case where a new incoming order object is received and processed through a group compatibility check stage and an individual compatibility check stage, as described above in reference to FIGS. 2-4.

Figure 6:
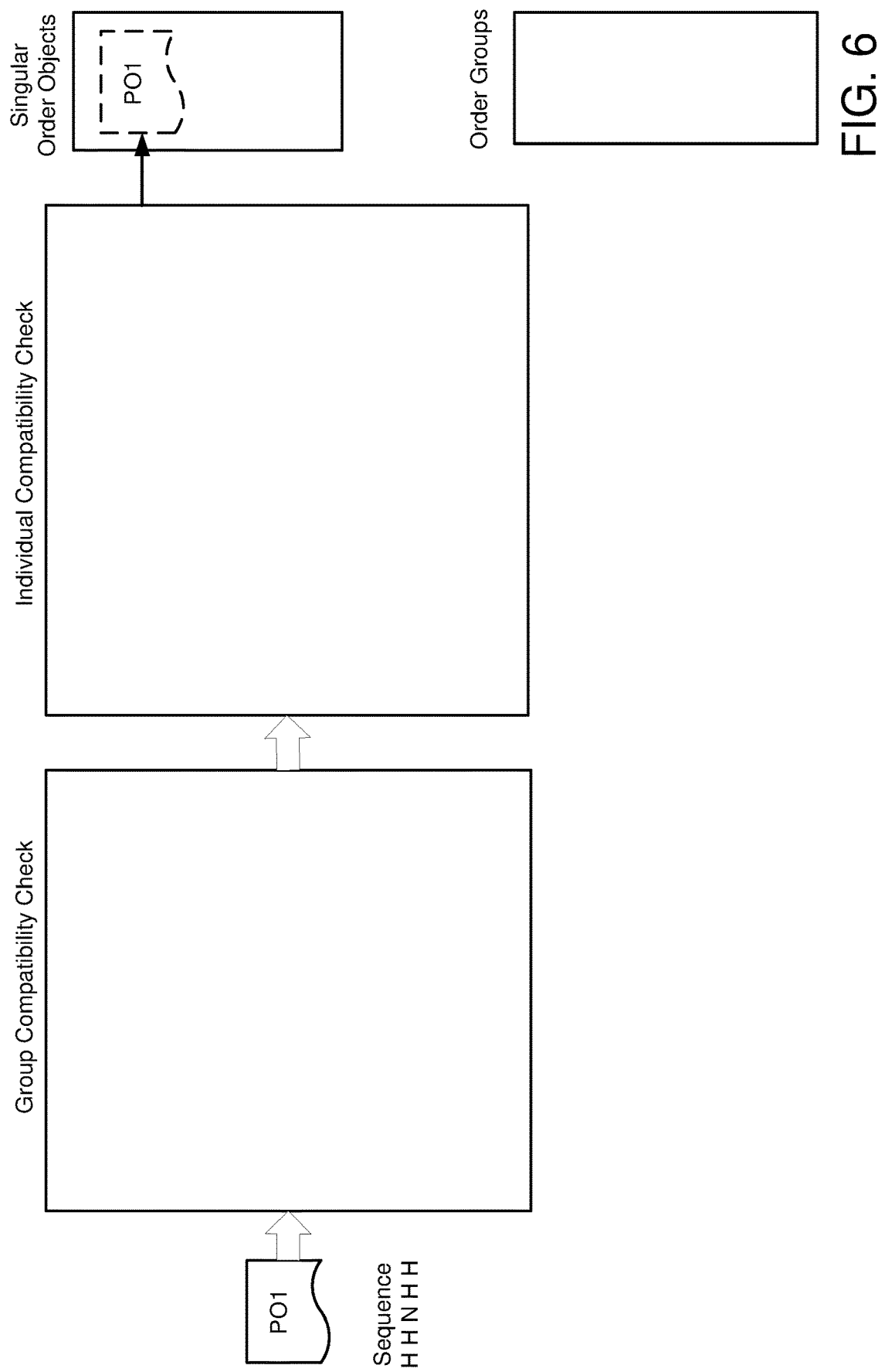
FIG. 6 is a schematic diagram depicting steps of an intelligent order grouping process after receiving a first incoming order PO1.

FIG. 6 shows an initial phase when a first order object PO1 (with a structure sequence H-H-N-H-H) is received. At the initial phase, there is no existing order group or existing order object. Thus, the incoming first order object PO1 can be labelled as a singular order object and added to the singular order dataset (e.g., according to the step 480 of FIG. 4). This is schematically illustrated by an arrow pointing to PO1 included in a box labelled "Singular order objects."

Figure 7:
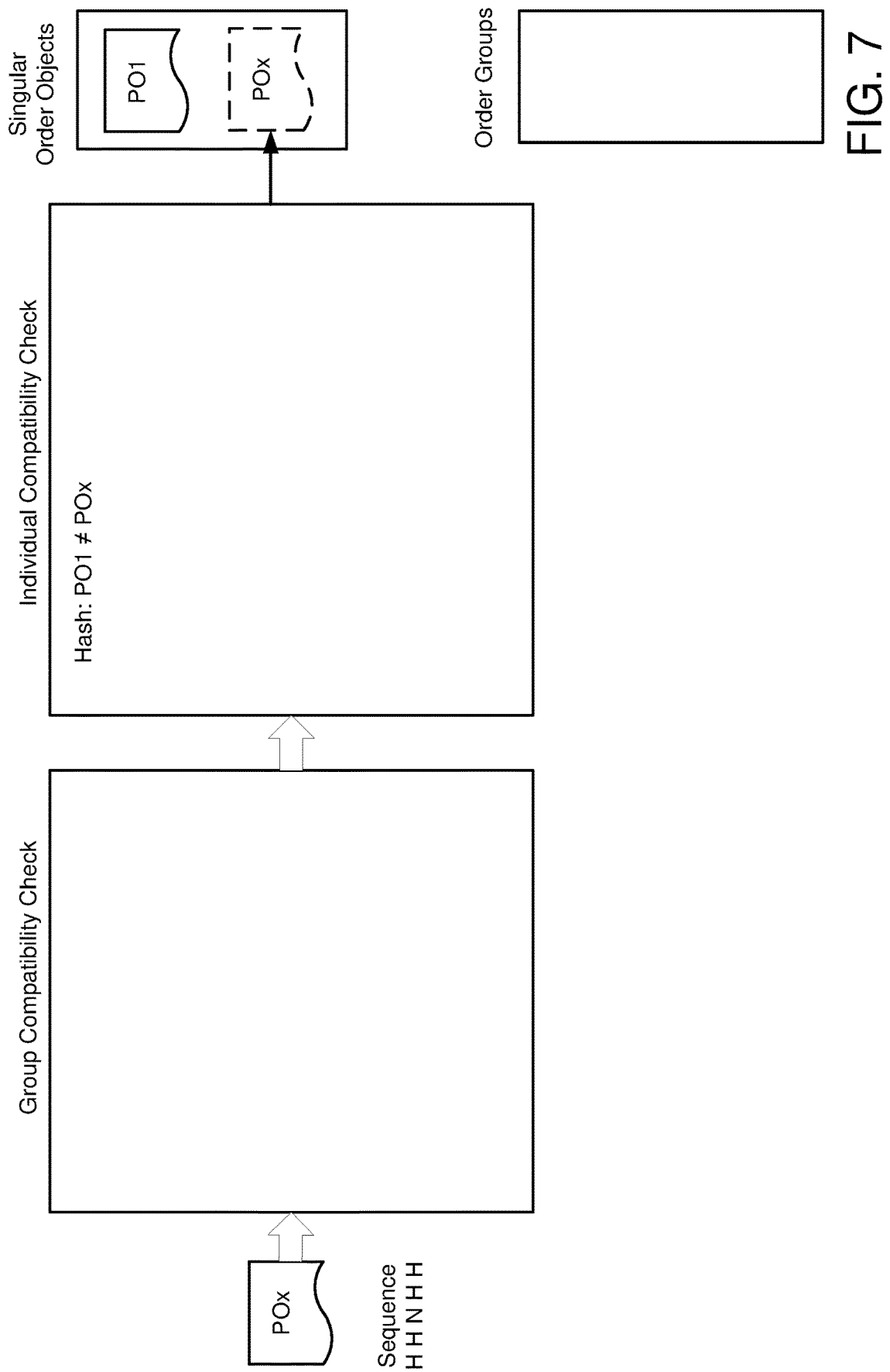
FIG. 7 is a schematic diagram depicting steps of an intelligent order grouping process after receiving another incoming order POx.

FIG. 7 shows the results after another incoming order object POx (with a structure sequence H-H-N-H-H) is received. Still, no group compatibility check is performed because there is no existing order group. In the individual compatibility check stage, it is assumed that PO1 and POx have at least one pair of mismatched hash values. Thus, POx is not compatible with the singular order object PO1. As a result, POx is also labelled as a singular order object and added to the singular order dataset.

Figure 8:
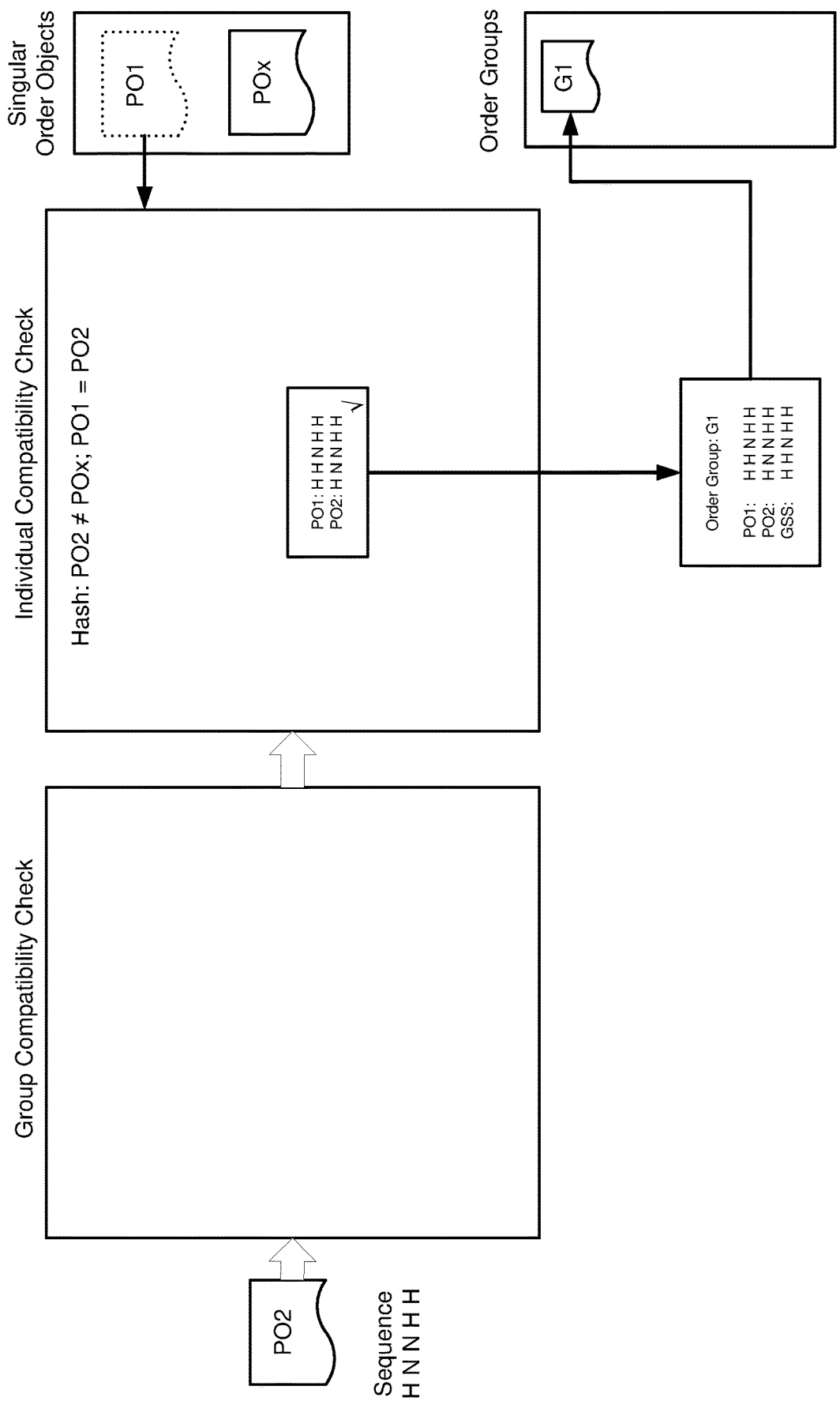
FIG. 8 is a schematic diagram depicting steps of an intelligent order grouping process after receiving another incoming order PO2.

FIG. 8 shows the results after another incoming order object PO2 (with a structure sequence H-N-N-H-H) is received. Still, no group compatibility check is performed because there is no existing order group. In the individual compatibility check stage, it is assumed that PO2 and POx are incompatible with each other because they have at least one pair of mismatched hash values. It is also assumed that the PO2 and PO1 have identical hash values. Further, it can be determined that the structure sequence of PO1 is compatible with the structure sequence of PO2 (indicated by a check mark). Thus, PO1 and PO2 are deemed to be compatible order objects, and a new order group G1 comprising PO1 and PO2 can be formed (e.g., according to the step 450 of FIG. 4). Using the logic operations described above, the group structure sequence (GSS) of the order group G1 is determined to be H-H-N-H-H. The new order group G1 can be included in the order group dataset (illustrated by the box labelled "Order Groups"). Further, PO1 can be removed from the singular order dataset (schematically illustrated by an arrow pointing away from the dotted PO1) because now it is a member of the new order group G1, thus leaving POx as the only remaining singular order object.

Figure 9:
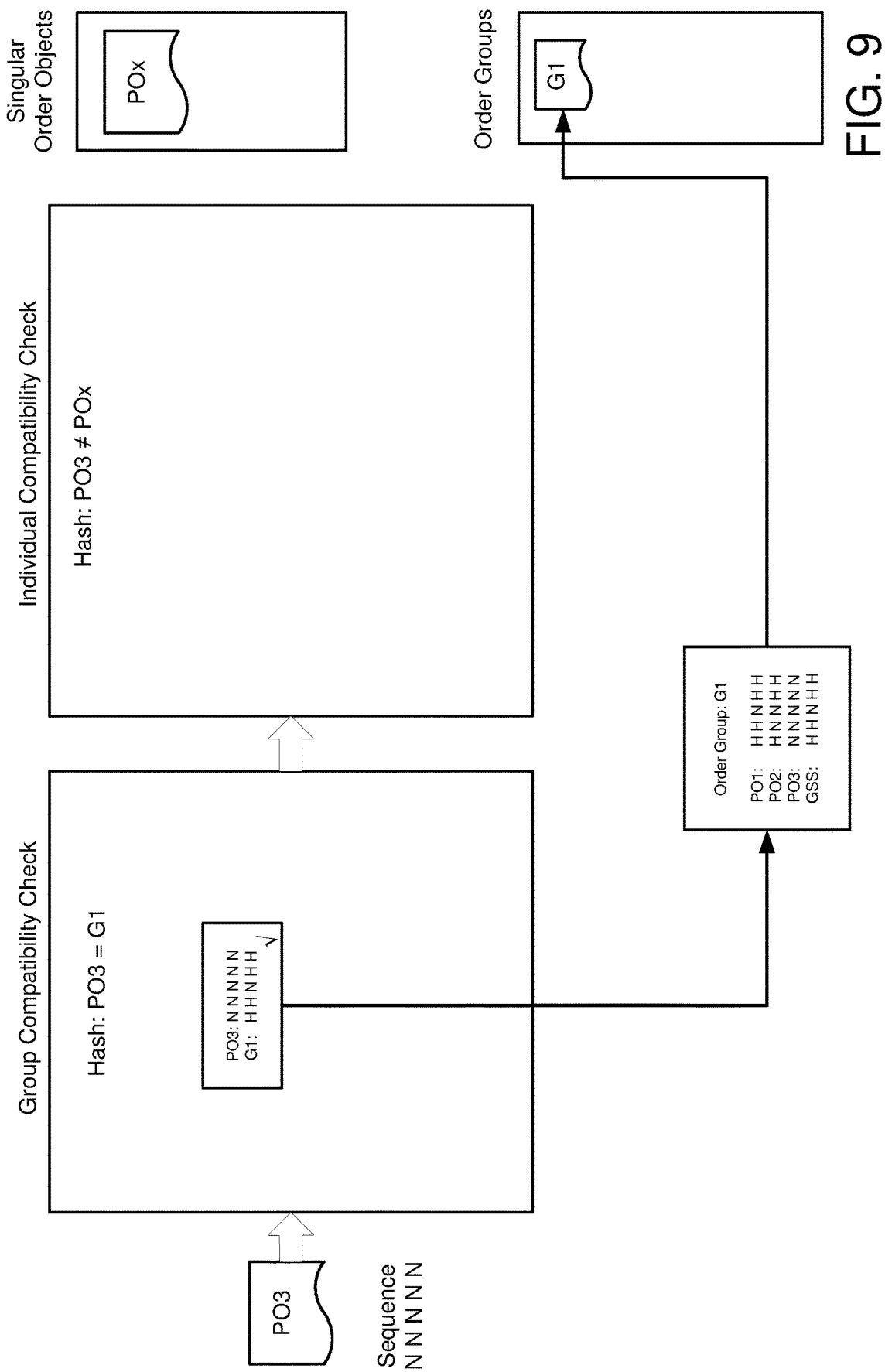
FIG. 9 is a schematic diagram depicting steps of an intelligent order grouping process after receiving another incoming order PO3.

FIG. 9 shows the results after another incoming order object PO3 (with a structure sequence N-N-N-N-N) is received. In the group compatibility check stage, PO3 is compared with the existing order group G1. In this example, it is assumed that PO3 and G1 have identical hash values. It can be determined that the structure sequence of the PO3 is compatible with the group structure sequence of G1 (indicated by a check mark). Thus, PO3 can be added to the order group G1 (e.g., according to the step 350 of FIG. 3). In this case, the group structure sequence of the order group G1 remains as H-H-N-H-H (because all indicators in the structure sequence of PO3 is N, they do not change the group indicator according to the logic operations depicted in FIG. 5). In the individual compatibility check stage, it is assumed that PO3 and POx have at least one pair of mismatched hash values. Thus, POx remains as a singular order object. In this example, POx is the only candidate order object to be evaluated in the individual compatibility check stage because all other existing order objects are in the order group G1 to which PO3 is added.

Figure 10:
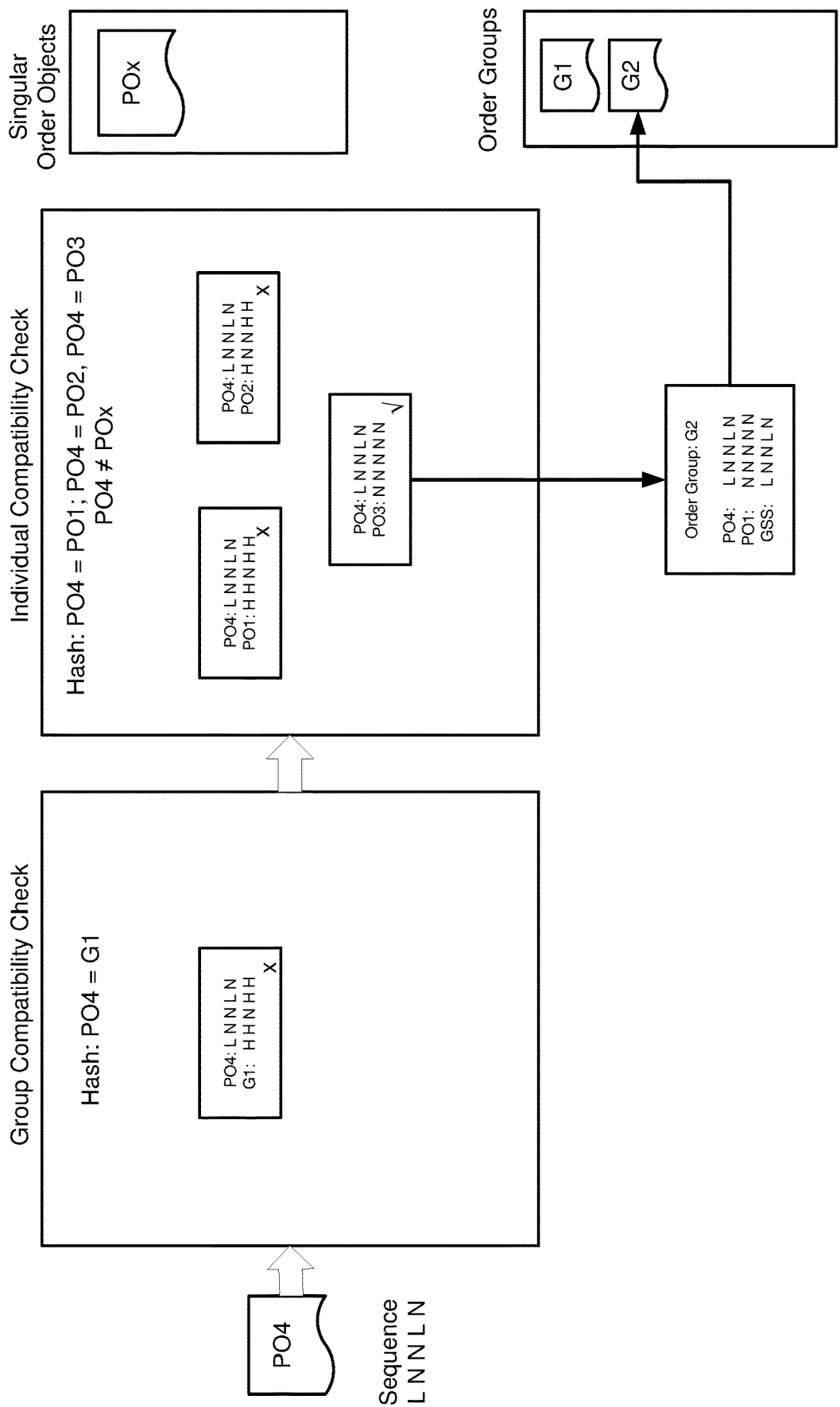
FIG. 10 is a schematic diagram depicting steps of an intelligent order grouping process after receiving another incoming order PO4.

FIG. 10 shows the results after another incoming order object PO4 (with a structure sequence L-N-N-L-N) is received. In the group compatibility check stage, PO4 is compared with the existing order group G1. In this example, it is assumed that PO4 and G1 have identical hash values. It can be determined that the structure sequence of PO4 is incompatible with the group structure sequence of G1 (indicated by a cross mark). In the individual compatibility check stage, four candidate order objects (PO1, PO2, PO3, and POx) are evaluated (PO1, PO2, and PO3 are candidate order objects because they are members of G1 to which PO4 cannot be added). In this example, it is assumed that hash values between PO1 and PO4, between PO2 and PO4, and between PO3 and PO4 have identical hash values, whereas PO4 and POx have mismatched hash values. It can be further determined that PO3 and PO4 have compatible structure sequences, whereas the structure sequence of PO4 is not compatible with the structure sequences of PO1 and PO2. Thus, a new order group G2 comprising PO1 and PO4 and with a group structure sequence L-N-N-L-N can be formed. The new order group G2 can be included in the order group dataset. POx remains as the only singular order object.

Figure 11:
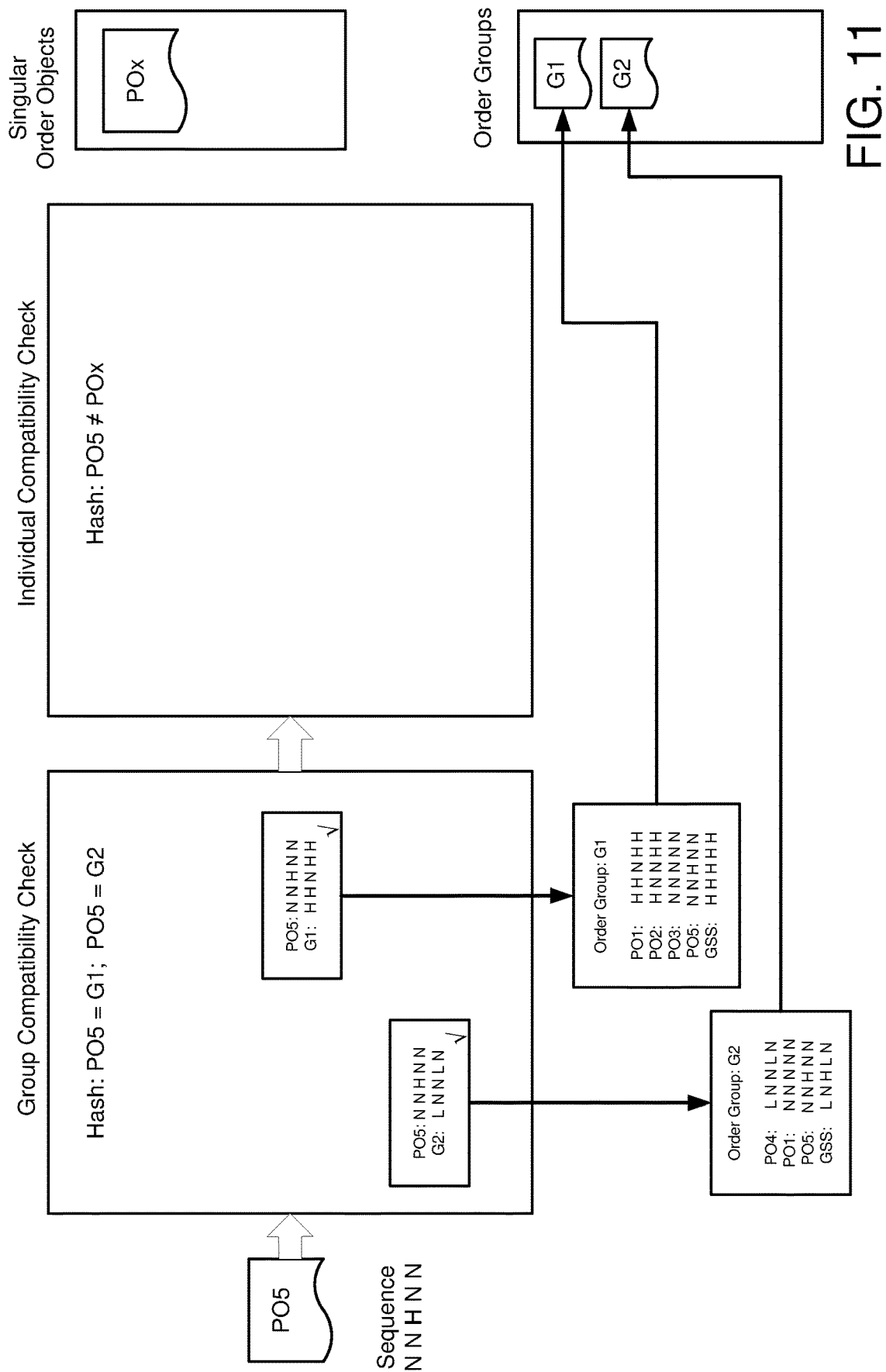
FIG. 11 is a schematic diagram depicting steps of an intelligent order grouping process after receiving another incoming order PO5.

FIG. 11 shows the results after another incoming order object PO5 (with a structure sequence N-N-H-N-N) is received. In the group compatibility check stage, PO5 is compared with existing order groups G1 and G2, respectively. In this example, it is assumed that PO5, G1, and G2 have identical hash values. It can be determined that the structure sequence of PO5 is compatible with the group structure sequences of both G1 and G2. Thus, PO5 can be added to both G1 and G2. After adding PO5, the group structure sequence of G1 is updated to H-H-H-H-H (i.e., the third indicator changes from N to H). After adding PO5, the group structure sequence of G2 remains unchanged (i.e., L-N-H-L-N). In the individual compatibility check stage, POx is the only candidate order object to be evaluated because all other existing order objects are in G1 and/or G2, both of which now includes PO5. In this example, it is assumed that there are mismatched hash values between PO5 and POx. Thus, POx remains as a singular order object.

Figure 12:
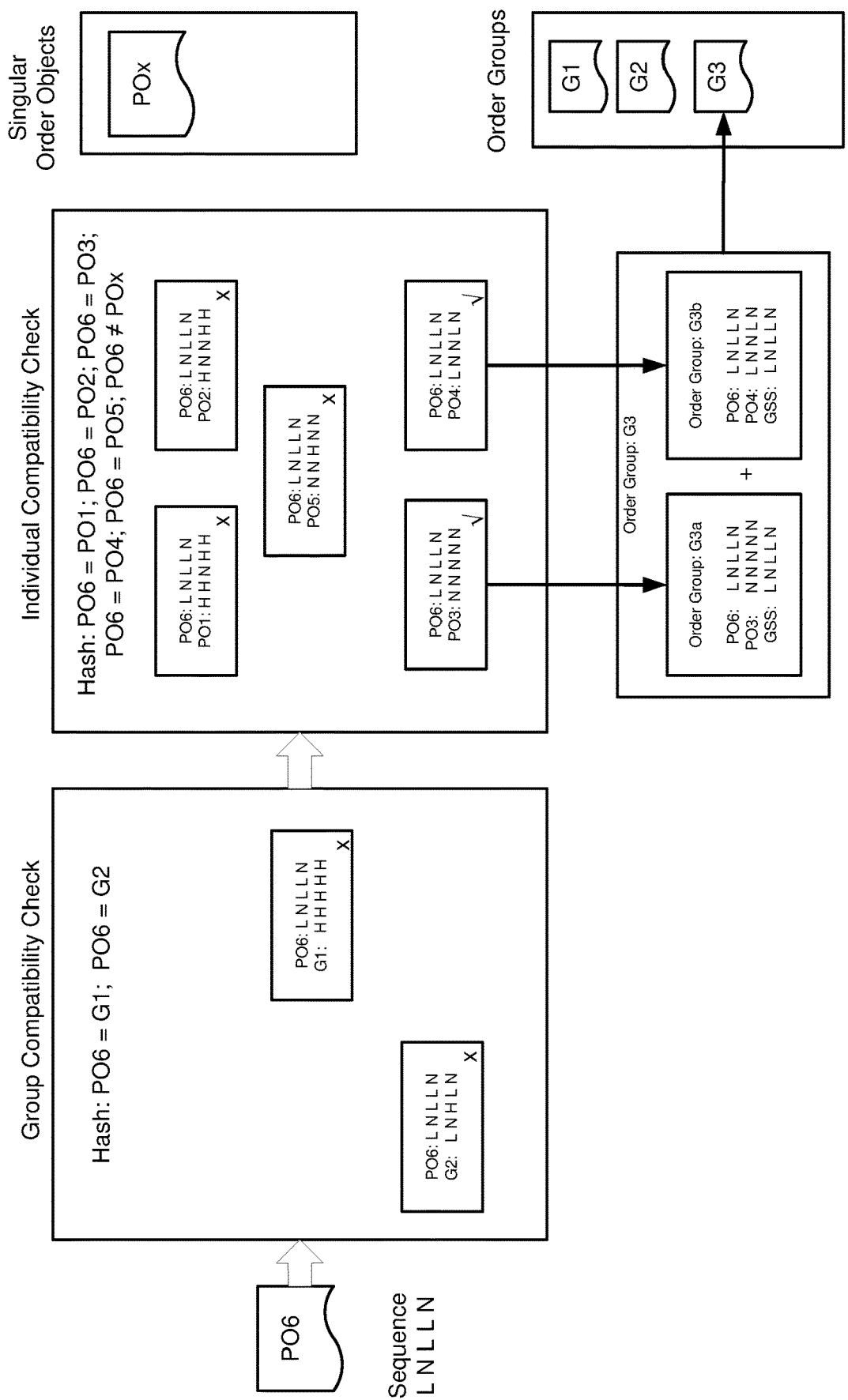
FIG. 12 is a schematic diagram depicting steps of an intelligent order grouping process after receiving another incoming order PO6.

FIG. 12 shows the results after another incoming order object PO6 (with a structure sequence L-N-L-L-N) is received. In the group compatibility check stage, PO6 is compared with existing order groups G1 and G2, respectively. In this example, it is assumed that PO6, G1, and G2 have identical hash values. It can be determined that the structure sequence of PO6 is not compatible with the group structure sequences of either G1 or G2. In the individual compatibility check stage, six candidate order objects (PO1, PO2, PO3, PO4, PO5, and POx) are evaluated. In this example, it is assumed that the hash values of PO6 match those of PO1, PO2, PO3, PO4, and PO5, but PO6 and POx have mismatched hash values. It can be further determined that incompatible structure sequences between PO1 and PO6, between PO2 and PO6, and between PO5 and PO6, whereas compatible structure sequences are found between PO3 and PO6, and between PO4 and PO6. Thus, two new order group, e.g., G3a comprising PO3 and PO6 and G3b comprising PO4 and PO6, can be formed. Because both G3a and G3b have compatible group structure sequences (actually identical in this case: L-N-L-L-N), G3a and G3b can be merged together to form a consolidated order group G3, which is included in the order group dataset. G3a and G3b can be deleted (i.e., they are intermediary order groups). POx remains as the only singular order object.

Figure 13:
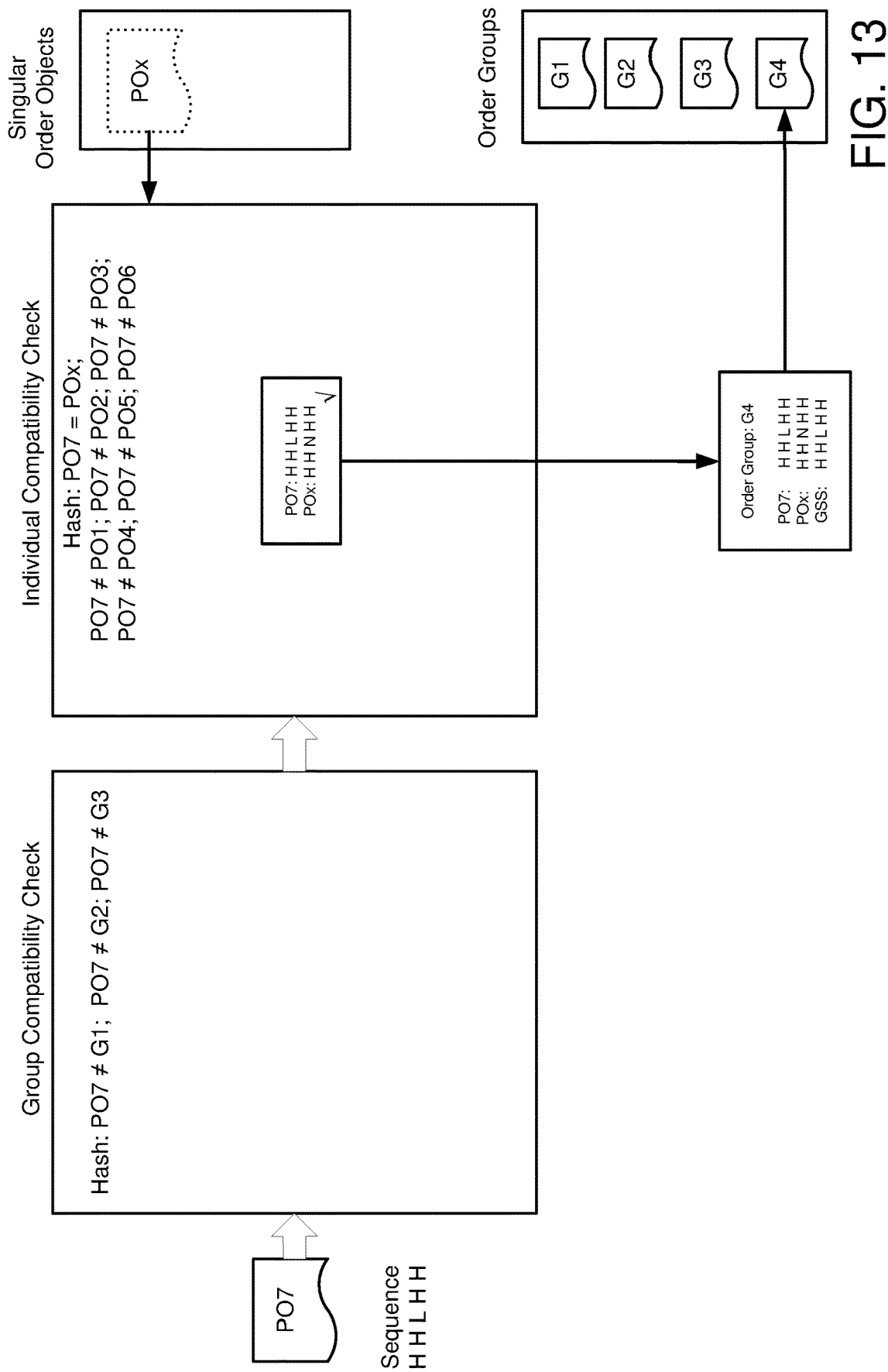
FIG. 13 is a schematic diagram depicting steps of an intelligent order grouping process after receiving another incoming order PO7.

FIG. 13 shows the results after another incoming order object PO7 (with a structure sequence H-H-L-H-H) is received. In the group compatibility check stage, PO7 is compared with existing order groups G1, G2, and G3, respectively. In this example, it is assumed that there are mismatched hash values between PO7 and G1, between PO7 and G2, and between PO7 and G3. In the individual compatibility check stage, seven candidate order objects (PO1, PO2, PO3, PO4, PO5, PO6, and POx) are evaluated. In this example, it is assumed that except for POx, all other candidate order objects have mismatched hash values compared to PO7. It can be further determined that PO7 and POx have compatible structure sequences. Thus, a new order group G4 comprising PO7 and POx (with a group structure sequence H-H-L-H-H) can be formed and included in the order group dataset. Additionally, POx can be removed from the singular order dataset since it is now a member of newly formed G4.

Figure 14:
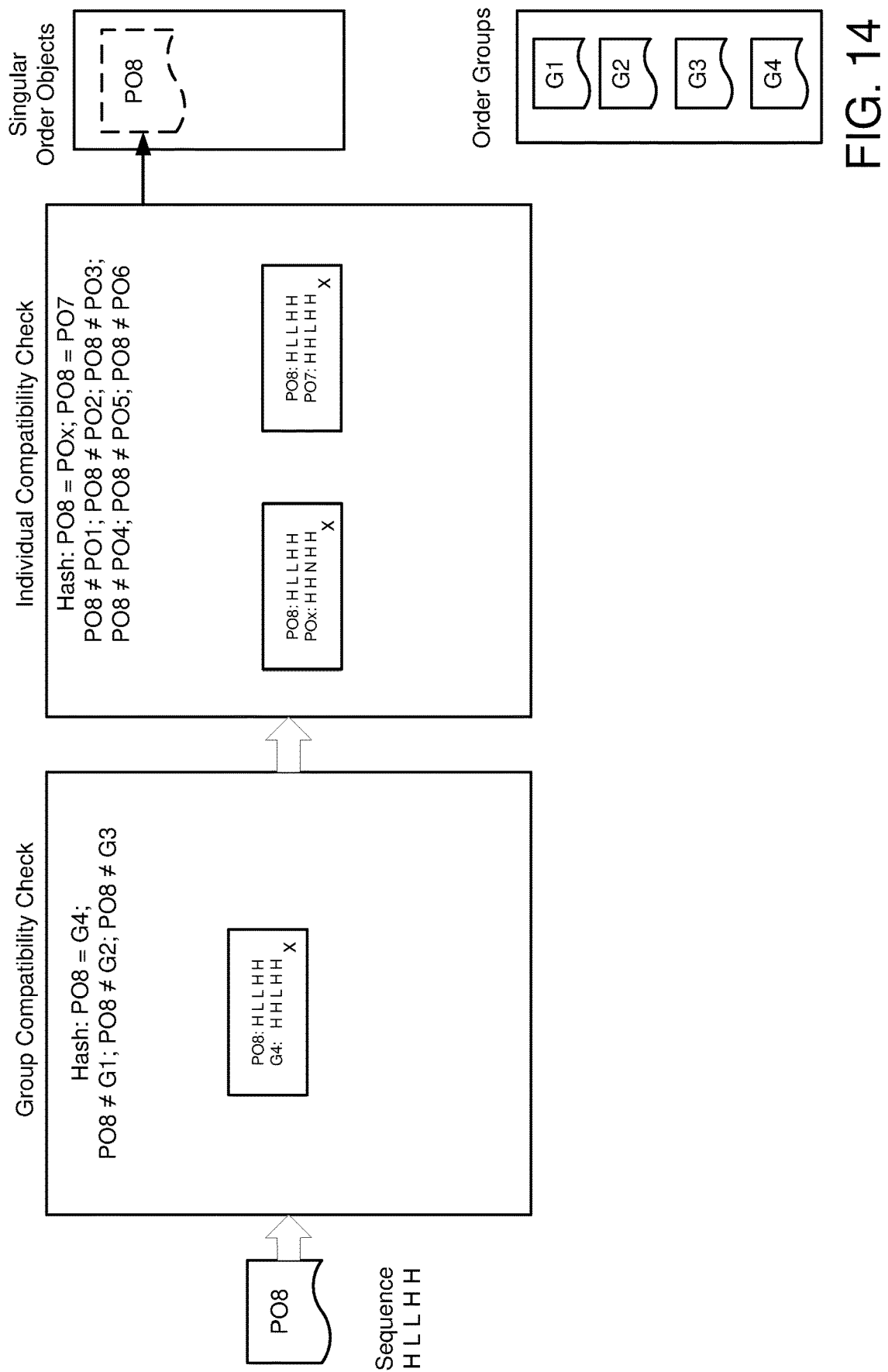
FIG. 14 is a schematic diagram depicting steps of an intelligent order grouping process after receiving another incoming order PO9.

FIG. 14 shows the results after another incoming order object PO8 (with a structure sequence H-L-L-H-H) is received. In the group compatibility check stage, PO8 is compared with existing order groups G1, G2, G3, and G4 respectively. In this example, it is assumed that there are mismatched hash values between PO8 and G1, between PO8 and G2, and between PO8 and G3, while PO8 and G4 have identical hash values. It can be determined that the structure sequence of PO8 is incompatible with the group structure sequences of G4. In the individual compatibility check stage, eight candidate order objects (PO1, PO2, PO3, PO4, PO5, PO6, PO7, and POx) are evaluated. In this example, it is assumed that except for POx and PO7, all other candidate order objects have mismatched hash values compared to PO8. It can be determined that the structure sequence of PO8 is not compatible with the structure sequences of either PO7 or POx. As a result, PO8 can be labelled as a singular order object and included in the singular order dataset.

Figure 15:
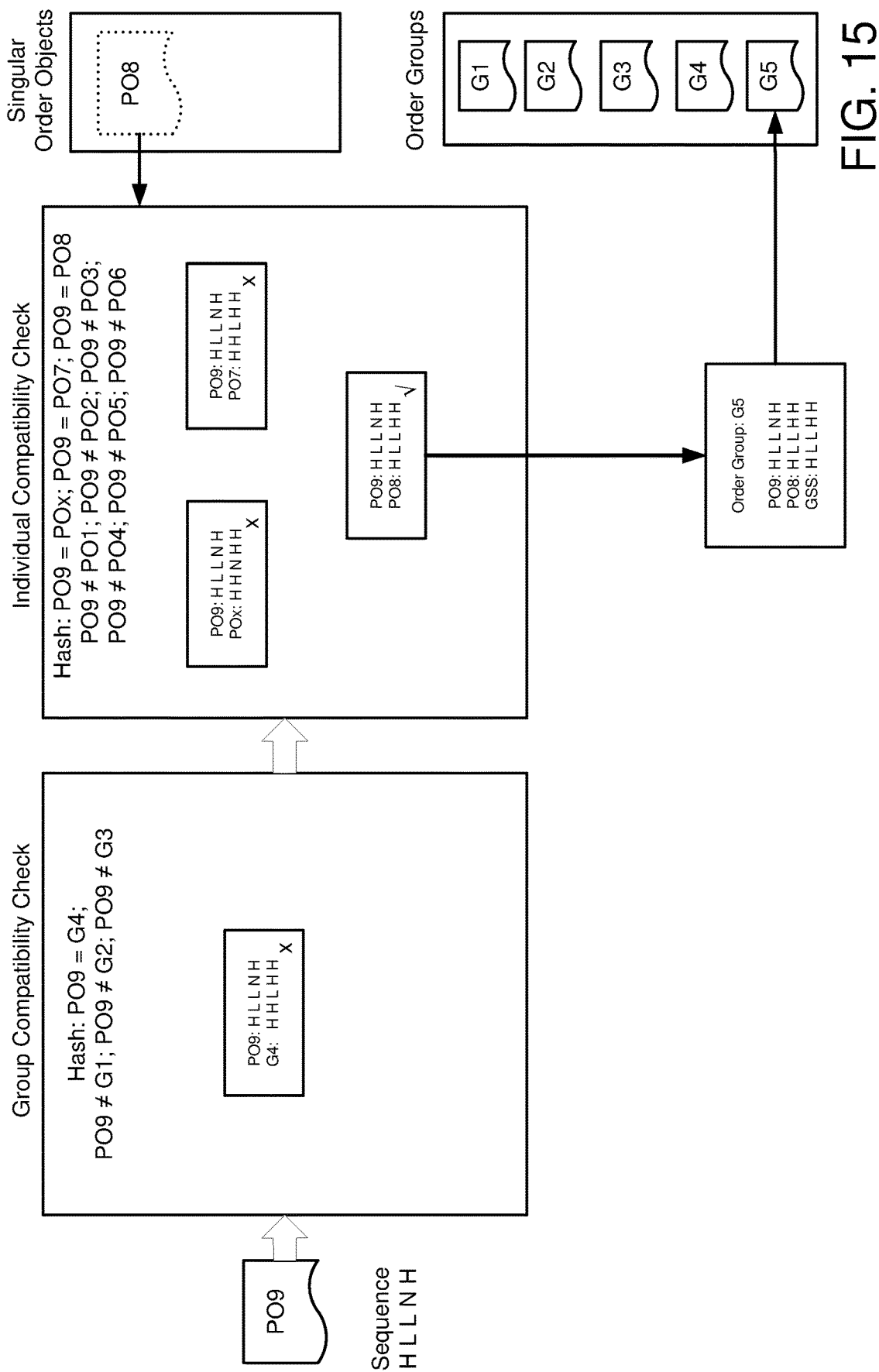
FIG. 15 is a schematic diagram depicting steps of an intelligent order grouping process after receiving another incoming order PO9.

FIG. 15 shows the results after another incoming order object PO9 (with a structure sequence H-L-L-N-H) is received. In the group compatibility check stage, PO9 is compared with existing order groups G1, G2, G3, and G4 respectively. In this example, it is assumed that there are mismatched hash values between PO9 and G1, between PO9 and G2, and between PO9 and G3, while PO9 and G4 have identical hash values. It can be determined that the structure sequence of PO9 is incompatible with the group structure sequences of G4. In the individual compatibility check stage, nine candidate order objects (PO1, PO2, PO3, PO4, PO5, PO6, PO7, PO8, and POx) are evaluated. In this example, it is assumed that except for POx, PO7, and PO8, all other candidate order objects have mismatched hash values compared to PO9. It can be determined that the structure sequence of PO9 is not compatible with the structure sequences of either POx or PO7, but PO9 and PO8 have compatible structure sequences. Thus, a new order group G5 comprising PO8 and PO9 (with a group structure sequence H-L-L-H-H) can be formed and included in the order group dataset. Additionally, PO8 can be removed from the singular order dataset since it is now a member of the newly formed G5.

Similar process can continue for other incoming order objects, each of which can be added to one or more existing order groups, or forming a new order group with some existing order objects, or designated as a singular order object. As such, summary statements can be generated based on a plurality of order objects included in any of the order groups.

Example 11—Example Advantages

A number of advantages can be achieved via the technologies described herein. For example, the intelligent order grouping system and related methods can automatically group order objects in runtime and reduce manual intervention, thus improving operation efficiency and grouping accuracy, which can lead to lower costs and improved customer satisfaction.

More specifically, the intelligent order grouping technology described herein combines hash comparison and structure sequence comparison.

The hash comparison not only can ensure all order objects included in an order group have the same underlying static header fields, but also allows faster comparison of static header fields. Moreover, the hash values used in compatibility check can be customizable depending on users' changing needs. For example, additional hash values representing other static header fields can be added and/or some existing hash values can be removed, as situation changes.

Order objects having different structures (e.g., structure elements located in different sections of the order objects) cannot be grouped together. Conventionally, assessing structure compatibility between different order objects has been difficult. By introducing structure sequences (including group structure sequences), and by further introducing logic operations to assess the compatibility of the structure sequences, the structure sequence comparison described herein can efficiently and accurately determine compatibility between different order objects, between an order object and an order group, and between order groups. The structure sequences are also customizable. For example, users can select how many and what structure elements are used to construct the structure sequences (e.g., new structure elements corresponding to newly introduced object fields can be added).

Thus, the intelligent order grouping technology described herein is also highly flexible. For example, if a user decides to select different structure elements for structure sequence comparison and/or select a new set of hash values for hash comparison, the received order objects can be regrouped in real-time based on the newly selected structure elements and/or hash values.

Example 12—Example Computing Systems

Figure 16:
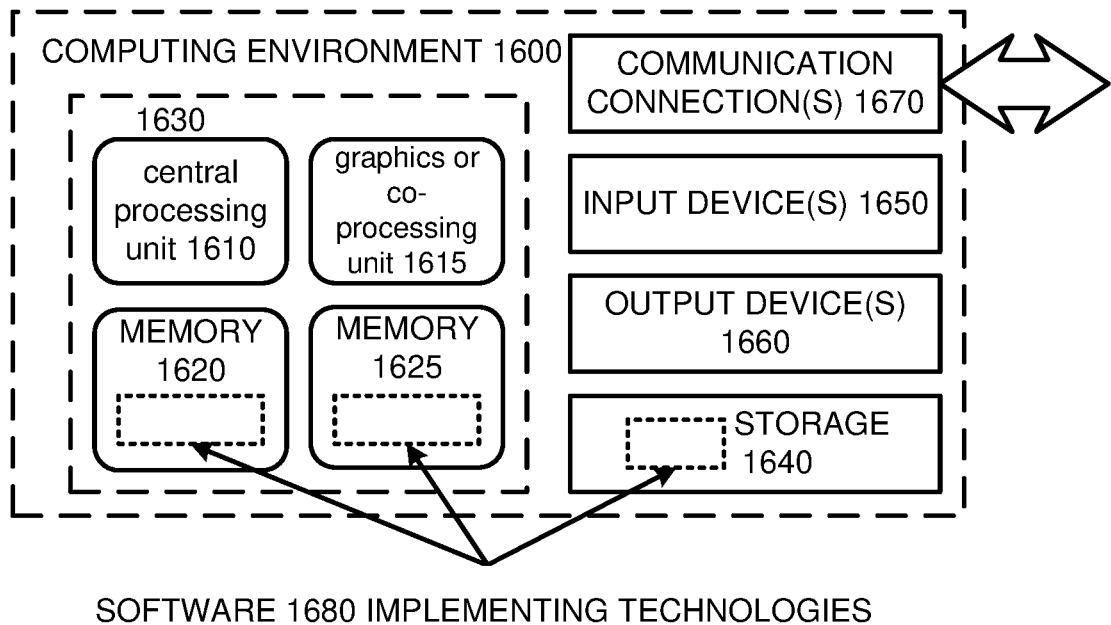
FIG. 16 is a block diagram of an example computing system in which described embodiments can be implemented.

FIG. 16 depicts an example of a suitable computing system 1600 in which the described innovations can be implemented. The computing system 1600 is not intended to suggest any limitation as to scope of use or functionality of the present disclosure, as the innovations can be implemented in diverse computing systems.

With reference to FIG. 16, the computing system 1600 includes one or more processing units 1610, 1615 and memory 1620, 1625. In FIG. 16, this basic configuration 1630 is included within a dashed line. The processing units 1610, 1615 can execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 16 shows a central processing unit 1610 as well as a graphics processing unit or co-processing unit 1615. The tangible memory 1620, 1625 can be volatile memory (e.g., registers, cache, RAM), non-volatile memory (e.g., ROM, EEPROM, flash memory, etc.), or some combination of the two, accessible by the processing unit(s) 1610, 1615. The memory 1620, 1625 can store software 1680 implementing one or more innovations described herein, in the form of computer-executable instructions suitable for execution by the processing unit(s) 1610, 1615.

A computing system 1600 can have additional features. For example, the computing system 1600 can include storage 1640, one or more input devices 1650, one or more output devices 1660, and one or more communication connections 1670, including input devices, output devices, and communication connections for interacting with a user. An interconnection mechanism (not shown) such as a bus, controller, or network can interconnect the components of the computing system 1600. Typically, operating system software (not shown) can provide an operating environment for other software executing in the computing system 1600, and coordinate activities of the components of the computing system 1600.

The tangible storage 1640 can be removable or non-removable, and includes magnetic disks, magnetic tapes or cassettes, CD-ROMs, DVDs, or any other medium which can be used to store information in a non-transitory way and which can be accessed within the computing system 1600. The storage 1640 can store instructions for the software 1680 implementing one or more innovations described herein.

The input device(s) 1650 can be an input device such as a keyboard, mouse, pen, or trackball, a voice input device, a scanning device, touch device (e.g., touchpad, display, or the like) or another device that provides input to the computing system 1600. The output device(s) 1660 can be a display, printer, speaker, CD-writer, or another device that provides output from the computing system 1600.

The communication connection(s) 1670 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 13—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 14—Example Cloud Computing Environment

Figure 17:
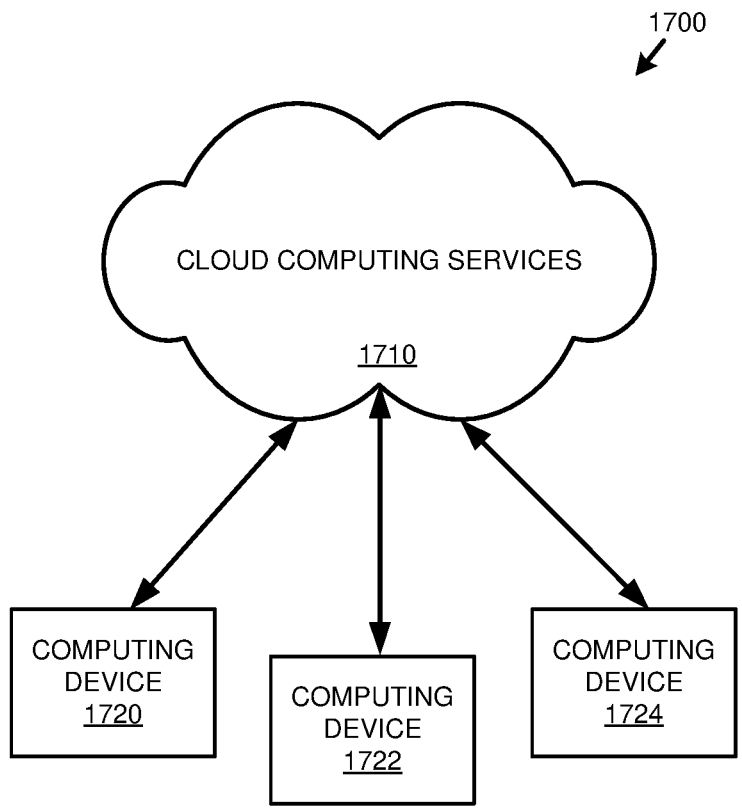
FIG. 17 is a block diagram of an example cloud computing environment that can be used in conjunction with the technologies described herein.

FIG. 17 depicts an example cloud computing environment 1700 in which the described technologies can be implemented, including, e.g., the system disclosed above and other systems herein. The cloud computing environment 1700 can include cloud computing services 1710. The cloud computing services 1710 can comprise various types of cloud computing resources, such as computer servers, data storage repositories, networking resources, etc. The cloud computing services 1710 can be centrally located (e.g., provided by a data center of a business or organization) or distributed (e.g., provided by various computing resources located at different locations, such as different data centers and/or located in different cities or countries).

The cloud computing services 1710 can be utilized by various types of computing devices (e.g., client computing devices), such as computing devices 1720, 1722, and 1724. For example, the computing devices (e.g., 1720, 1722, and 1724) can be computers (e.g., desktop or laptop computers), mobile devices (e.g., tablet computers or smart phones), or other types of computing devices. For example, the computing devices (e.g., 1720, 1722, and 1724) can utilize the cloud computing services 1710 to perform computing operations (e.g., data processing, data storage, and the like).

In practice, cloud-based, on-premises-based, or hybrid scenarios can be supported.

Example 15—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 16—Example Embodiments

Any of the following embodiments can be implemented.

Example 1. A computer-implemented method comprising: receiving an incoming order object; determining, at runtime, compatibility between the incoming order object and an existing order group; responsive to finding that the incoming order object is compatible with the existing order group, adding the incoming order object to the existing order group; determining, at runtime, compatibility between the incoming order object and an existing order object; and responsive to finding that the incoming order object is compatible with the existing order object, forming a new object group comprising the incoming order object and the existing order object, wherein determining compatibility between the incoming order object and the existing order group comprises pairwise comparison between a structure sequence of the incoming order object and a group structure sequence of the existing order group, wherein the group structure sequence represents structure sequences of order objects included in the existing order group, wherein determining compatibility between the incoming order object and the existing order object comprises pairwise comparison between the structure sequence of the incoming order object and a structure sequence of the existing order object, wherein the structure sequence of a selected order object comprises a sequence of indicators, wherein an indicator indicates that a corresponding structure element exists in a first section or a second section of the selected order object or does not exist in the selected order object.

Example 2. The method of example 1, wherein determining compatibility between the incoming order object and the existing order group further comprises: comparing, at runtime, one or more hash values of the incoming order object with corresponding hash values of the existing order group, wherein the hash values of the existing order group represent hash values of order objects included in the existing order group; and responsive to finding a mismatch between a hash value of the incoming order object and the corresponding hash value of the existing order group, indicating that the incoming order object is not compatible with the existing order group.

Example 3. The method of any one of examples 1-2, wherein determining compatibility between the incoming order object and the existing order object further comprises: comparing, at runtime, one or more hash values of the incoming order object with corresponding hash values of the existing order object; and responsive to finding a mismatch between a hash value of the incoming order object and the corresponding hash value of the existing order object, indicating that the incoming order object is not compatible with the existing order object.

Example 4. The method of any one of examples 1-3, wherein: responsive to finding that one structure element exists in different sections of the incoming order object and the existing order object, indicating that the incoming order object is not compatible with the existing order object; and responsive to finding that no structure element exists in different sections of the incoming order object and the existing order object, indicating that the incoming order object is compatible with the existing order object.

Example 5. The method of any one of examples 1-4, wherein forming the new object group comprises generating, at runtime, a group structure sequence of the new object group based on the structure sequences of the incoming order object and the existing order object.

Example 6. The method of example 5, wherein the group structure sequence comprises a sequence of group indicators, wherein a group indicator indicates that a corresponding structure element exists in the first section or the second section of at least one of the incoming order object and the existing order object, or the corresponding structure element does not exist in either the incoming order object or the existing order object.

Example 7. The method of any one of examples 1-6, wherein the existing order object is a first existing order object and the new object group is a first new object group, wherein the method further comprises: responsive to finding that the incoming order object is compatible with a second existing order object, forming a second new object group comprising the incoming order object and the second existing order object; determining, at runtime, compatibility between the first new object group and the second new object group; and responsive to finding that the first new object group is compatible with the second new object group, merging the first and second new object groups into a consolidated new object group, and removing the first and second new object groups.

Example 8. The method of example 7, wherein determining compatibility between the first new object group and the second new object group comprises pairwise comparison between a first group structure sequence of the first new object group and a second group structure sequence of the second new object group.

Example 9. The method of any one of examples 1-8, wherein adding the incoming order object to the existing order group comprises updating the group structure sequence of the existing order group based on the structure sequence of the incoming order object.

Example 10. The method of example 9, wherein the updating comprises: identifying a group indicator in the group structure sequence which indicates that a corresponding structure element does not exist in the order objects included in the existing order group; and responsive to finding that a paired indicator in the structure sequence of the incoming order object indicates that the corresponding structure element exists in the first or second section of the incoming order object, changing the group indicator in the group structure sequence to indicate that the corresponding structure element exists in at least one of the order objects included in the existing order group.

Example 11. A computing system comprising: memory; one or more hardware processors coupled to the memory; and one or more computer readable storage media storing instructions that, when loaded into the memory, cause the one or more hardware processors to perform operations comprising: receiving an incoming order object; determining, at runtime, compatibility between the incoming order object and an existing order group; responsive to finding that the incoming order object is compatible with the existing order group, adding the incoming order object to the existing order group; determining, at runtime, compatibility between the incoming order object and an existing order object; and responsive to finding that the incoming order object is compatible with the existing order object, forming a new object group comprising the incoming order object and the existing order object, wherein determining compatibility between the incoming order object and the existing order group comprises pairwise comparison between a structure sequence of the incoming order object and a group structure sequence of the existing order group, wherein the group structure sequence represents structure sequences of order objects included in the existing order group, wherein determining compatibility between the incoming order object and the existing order object comprises pairwise comparison between the structure sequence of the incoming order object and a structure sequence of the existing order object, wherein the structure sequence of a selected order object comprises a sequence of indicators, wherein an indicator indicates that a corresponding structure element exists in a first section or a second section of the selected order object or does not exist in the selected order object.

Example 12. The system of example 11, wherein determining compatibility between the incoming order object and the existing order group further comprises: comparing, at runtime, one or more hash values of the incoming order object with corresponding hash values of the existing order group, wherein the hash values of the existing order group represent hash values of order objects included in the existing order group; and responsive to finding a mismatch between a hash value of the incoming order object and the corresponding hash value of the existing order group, indicating that the incoming order object is not compatible with the existing order group.

Example 13. The system of any one of examples 11-12, wherein determining compatibility between the incoming order object and the existing order object further comprises: comparing, at runtime, one or more hash values of the incoming order object with corresponding hash values of the existing order object; and responsive to finding a mismatch between a hash value of the incoming order object and the corresponding hash value of the existing order object, indicating that the incoming order object is not compatible with the existing order object.

Example 14. The system of any one of examples 11-13, wherein: responsive to finding that one structure element exists in different sections of the incoming order object and the existing order object, indicating that the incoming order object is not compatible with the existing order object; and responsive to finding that no structure element exists in different sections of the incoming order object and the existing order object, indicating that the incoming order object is compatible with the existing order object.

Example 15. The system of any one of examples 11-14, wherein forming the new object group comprises generating, at runtime, a group structure sequence of the new object group based on the structure sequences of the incoming order object and the existing order object.

Example 16. The system of example 15, wherein the group structure sequence comprises a sequence of group indicators, wherein a group indicator indicates that a corresponding structure element exists in the first section or the second section of at least one of the incoming order object and the existing order object, or the corresponding structure element does not exist in either the incoming order object or the existing order object.

Example 17. The system of any one of examples 11-16, wherein the existing order object is a first existing order object and the new object group is a first new object group, wherein the operations further comprise: responsive to finding that the incoming order object is compatible with a second existing order object, forming a second new object group comprising the incoming order object and the second existing order object; determining, at runtime, compatibility between the first new object group and the second new object group; and responsive to finding that the first new object group is compatible with the second new object group, merging the first and second new object groups into a consolidated new object group, and removing the first and second new object groups, wherein determining compatibility between the first new object group and the second new object group comprises pairwise comparison between a first group structure sequence of the first new object group and a second group structure sequence of the second new object group.

Example 18. The system of any one of examples 11-17, wherein adding the incoming order object to the existing order group comprises updating the group structure sequence of the existing order group based on the structure sequence of the incoming order object.

Example 19. The system of example 18, wherein the updating comprises: identifying a group indicator in the group structure sequence which indicates that a corresponding structure element does not exist in the order objects included in the existing order group; and responsive to finding that a paired indicator in the structure sequence of the incoming order object indicates that the corresponding structure element exists in the first or second section of the incoming order object, changing the group indicator in the group structure sequence to indicate that the corresponding structure element exists in at least one of the order objects included in the existing order group.

Example 20. One or more non-transitory computer-readable media having encoded thereon computer-executable instructions causing one or more processors to perform a method comprising: receiving an incoming order object; determining, at runtime, compatibility between the incoming order object and an existing order group; responsive to finding that the incoming order object is compatible with the existing order group, adding the incoming order object to the existing order group; determining, at runtime, compatibility between the incoming order object and an existing order object; responsive to finding that the incoming order object is compatible with the existing order object, forming a new object group comprising the incoming order object and the existing order object; and generating a summary statement based on the existing order group, wherein determining compatibility between the incoming order object and the existing order group comprises pairwise comparison between a structure sequence of the incoming order object and a group structure sequence of the existing order group, wherein the group structure sequence represents structure sequences of order objects included in the existing order group, wherein determining compatibility between the incoming order object and the existing order object comprises pairwise comparison between the structure sequence of the incoming order object and a structure sequence of the existing order object, wherein the structure sequence of a selected order object comprises a sequence of indicators, wherein an indicator indicates that a corresponding structure element exists in a first section or a second section of the selected order object or does not exist in the selected order object, wherein the summary statement includes data of one or more order objects included in the existing order group.

Example 17—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for real-time grouping of order objects for generating a consolidated summary statement in an enterprise order management system, the method comprising:
receiving, by a grouping engine, an incoming order object;
determining, at runtime and by the grouping engine, whether the incoming order object is structurally compatible with an existing order group stored in an order group dataset;
responsive to finding that the incoming order object is structurally compatible with the existing order group, adding the incoming order object to the existing order group;
determining, at runtime and by the grouping engine, whether the incoming order object is structurally compatible with an existing order object stored in a singular order dataset; and
responsive to finding that the incoming order object is structurally compatible with the existing order object, forming a new object group comprising the incoming order object and the existing order object, and storing the new order group in the order group dataset;
responsive to determining that the incoming order object is not structurally compatible with any order object stored in the singular order dataset or any order group stored in the order group dataset, storing the incoming order object as a singular order object in the singular order dataset;
generating, by a summary generator, a summary statement based on a selected order group included in the order group dataset, the summary statement consolidating order objects of the selected order group using a common structure that includes fields corresponding to structure elements present in at least one of the order objects of the selected order group,
wherein determining structural compatibility between the incoming order object and the existing order group comprises performing a pairwise comparison between a structure sequence of the incoming order object and a group structure sequence of the existing order group, wherein the group structure sequence represents structure sequences of order objects included in the existing order group,
wherein determining structural compatibility between the incoming order object and the existing order object comprises performing a pairwise comparison between the structure sequence of the incoming order object and a structure sequence of the existing order object,
wherein the structure sequence of a selected order object comprises a sequence of indicators, wherein each indicator indicates whether a corresponding structure element exists in a first section or a second section of the selected order object or does not exist in the selected order object.

2. The method of claim 1, wherein determining compatibility between the incoming order object and the existing order group further comprises:

comparing, at runtime, one or more hash values of the incoming order object with corresponding hash values of the existing order group, wherein the hash values of the existing order group represent hash values of order objects included in the existing order group; and responsive to finding a mismatch between a hash value of the incoming order object and the corresponding hash value of the existing order group, indicating that the incoming order object is not compatible with the existing order group.

3. The method of claim 1, wherein determining compatibility between the incoming order object and the existing order object further comprises:

comparing, at runtime, one or more hash values of the incoming order object with corresponding hash values of the existing order object; and responsive to finding a mismatch between a hash value of the incoming order object and the corresponding hash value of the existing order object, indicating that the incoming order object is not compatible with the existing order object.

4. The method of claim 1, wherein:

responsive to finding that one structure element exists in different sections of the incoming order object and the existing order object, indicating that the incoming order object is not compatible with the existing order object; and responsive to finding that no structure element exists in different sections of the incoming order object and the existing order object, indicating that the incoming order object is compatible with the existing order object.

5. The method of claim 1, wherein forming the new object group comprises generating, at runtime, a group structure sequence of the new object group based on the structure sequences of the incoming order object and the existing order object.

6. The method of claim 5, wherein the group structure sequence comprises a sequence of group indicators, wherein a group indicator indicates that a corresponding structure element exists in the first section or the second section of at least one of the incoming order object and the existing order object, or the corresponding structure element does not exist in either the incoming order object or the existing order object.

7. The method of claim 1, wherein the existing order object is a first existing order object and the new object group is a first new object group, wherein the method further comprises:

responsive to finding that the incoming order object is compatible with a second existing order object, forming a second new object group comprising the incoming order object and the second existing order object;

determining, at runtime, compatibility between the first new object group and the second new object group; and responsive to finding that the first new object group is compatible with the second new object group, merging the first and second new object groups into a consolidated new object group, and removing the first and second new object groups.

8. The method of claim 7, wherein determining compatibility between the first new object group and the second new object group comprises pairwise comparison between a first group structure sequence of the first new object group and a second group structure sequence of the second new object group.

9. The method of claim 1, wherein adding the incoming order object to the existing order group comprises updating the group structure sequence of the existing order group based on the structure sequence of the incoming order object.

10. The method of claim 9, wherein the updating comprises:

identifying a group indicator in the group structure sequence which indicates that a corresponding structure element does not exist in the order objects included in the existing order group; and responsive to finding that a paired indicator in the structure sequence of the incoming order object indicates that the corresponding structure element exists in the first or second section of the incoming order object, changing the group indicator in the group structure sequence to indicate that the corresponding structure element exists in at least one of the order objects included in the existing order group.

11. A computing system for real-time grouping of order objects for generating a consolidated summary statement in an enterprise order management system, the computing system comprising:

memory;

one or more hardware processors coupled to the memory; and one or more computer readable storage media storing instructions that, when loaded into the memory, cause the one or more hardware processors to perform operations comprising:

receiving, by a grouping engine, an incoming order object;

determining, at runtime and by the grouping engine, whether the incoming order object is structurally compatible with an existing order group stored in an order group dataset;

responsive to finding that the incoming order object is structurally compatible with the existing order group, adding the incoming order object to the existing order group;

determining, at runtime and by the grouping engine, whether the incoming order object is structurally compatible with an existing order object stored in a singular order dataset; and responsive to finding that the incoming order object is structurally compatible with the existing order object, forming a new object group comprising the incoming order object and the existing order object, and storing the new order group in the order group dataset;

responsive to determining that the incoming order object is not structurally compatible with any order object stored in the singular order dataset or any order group stored in the order group dataset, storing the incoming order object as a singular order object in the singular order dataset;

generating, by a summary generator, a summary statement based on a selected order group included in the order group dataset, the summary statement consolidating order objects of the selected order group using a common structure that includes fields corresponding to structure elements present in at least one of the order objects of the selected order group, wherein determining structural compatibility between the incoming order object and the existing order group comprises performing a pairwise comparison between a structure sequence of the incoming order object and a group structure sequence of the existing order group, wherein the group structure sequence represents structure sequences of order objects included in the existing order group, wherein determining structural compatibility between the incoming order object and the existing order object comprises performing a pairwise comparison between the structure sequence of the incoming order object and a structure sequence of the existing order object, wherein the structure sequence of a selected order object comprises a sequence of indicators, wherein each indicator indicates whether a corresponding structure element exists in a first section or a second section of the selected order object or does not exist in the selected order object.

12. The system of claim 11, wherein determining compatibility between the incoming order object and the existing order group further comprises:

comparing, at runtime, one or more hash values of the incoming order object with corresponding hash values of the existing order group, wherein the hash values of the existing order group represent hash values of order objects included in the existing order group; and responsive to finding a mismatch between a hash value of the incoming order object and the corresponding hash value of the existing order group, indicating that the incoming order object is not compatible with the existing order group.

13. The system of claim 11, wherein determining compatibility between the incoming order object and the existing order object further comprises:

comparing, at runtime, one or more hash values of the incoming order object with corresponding hash values of the existing order object; and responsive to finding a mismatch between a hash value of the incoming order object and the corresponding hash value of the existing order object, indicating that the incoming order object is not compatible with the existing order object.

14. The system of claim 11, wherein:

responsive to finding that one structure element exists in different sections of the incoming order object and the existing order object, indicating that the incoming order object is not compatible with the existing order object; and responsive to finding that no structure element exists in different sections of the incoming order object and the existing order object, indicating that the incoming order object is compatible with the existing order object.

15. The system of claim 11, wherein forming the new object group comprises generating, at runtime, a group structure sequence of the new object group based on the structure sequences of the incoming order object and the existing order object.

16. The system of claim 15, wherein the group structure sequence comprises a sequence of group indicators, wherein a group indicator indicates that a corresponding structure element exists in the first section or the second section of at least one of the incoming order object and the existing order object, or the corresponding structure element does not exist in either the incoming order object or the existing order object.

17. The system of claim 11, wherein the existing order object is a first existing order object and the new object group is a first new object group, wherein the operations further comprise:

responsive to finding that the incoming order object is compatible with a second existing order object, forming a second new object group comprising the incoming order object and the second existing order object;

determining, at runtime, compatibility between the first new object group and the second new object group; and responsive to finding that the first new object group is compatible with the second new object group, merging the first and second new object groups into a consolidated new object group, and removing the first and second new object groups, wherein determining compatibility between the first new object group and the second new object group comprises pairwise comparison between a first group structure sequence of the first new object group and a second group structure sequence of the second new object group.

18. The system of claim 11, wherein adding the incoming order object to the existing order group comprises updating the group structure sequence of the existing order group based on the structure sequence of the incoming order object.

19. The system of claim 18, wherein the updating comprises:

identifying a group indicator in the group structure sequence which indicates that a corresponding structure element does not exist in the order objects included in the existing order group; and responsive to finding that a paired indicator in the structure sequence of the incoming order object indicates that the corresponding structure element exists in the first or second section of the incoming order object, changing the group indicator in the group structure sequence to indicate that the corresponding structure element exists in at least one of the order objects included in the existing order group.

20. One or more non-transitory computer-readable media having encoded thereon computer-executable instructions causing one or more processors to perform a method for real-time grouping of order objects for generating a consolidated summary statement in an enterprise order management system, the method comprising:

receiving, by a grouping engine, an incoming order object;

determining, at runtime and by the grouping engine, whether the incoming order object is structurally compatible with an existing order group stored in an order group dataset;

responsive to finding that the incoming order object is structurally compatible with the existing order group, adding the incoming order object to the existing order group;

determining, at runtime and by the grouping engine, whether the incoming order object is structurally compatible with an existing order object stored in a singular order dataset; and responsive to finding that the incoming order object is structurally compatible with the existing order object, forming a new object group comprising the incoming order object and the existing order object, and storing the new order group in the order group dataset;

responsive to determining that the incoming order object is not structurally compatible with any order object stored in the singular order dataset or any order group stored in the order group dataset, storing the incoming order object as a singular order object in the singular order dataset;

generating, by a summary generator, a summary statement based on a selected order group included in the order group dataset, the summary statement consolidating order objects of the selected order group using a common structure that includes fields corresponding to structure elements present in at least one of the order objects of the selected order group, wherein determining structural compatibility between the incoming order object and the existing order group comprises performing a pairwise comparison between a structure sequence of the incoming order object and a group structure sequence of the existing order group, wherein the group structure sequence represents structure sequences of order objects included in the existing order group, wherein determining structural compatibility between the incoming order object and the existing order object comprises performing a pairwise comparison between the structure sequence of the incoming order object and a structure sequence of the existing order object, wherein the structure sequence of a selected order object comprises a sequence of indicators, wherein each indicator indicates whether a corresponding structure element exists in a first section or a second section of the selected order object or does not exist in the selected order object.

* * * * *